US012809481B2

(12) United States Patent
Kang et al.

(10) Patent No.: US 12,809,481 B2
(45) Date of Patent: Nov. 24, 2026

(54) INPUT SENSING DEVICE AND DISPLAY DEVICE INCLUDING INPUT SENSING DEVICE WITH SENSING DRIVING CIRCUIT THAT INCLUDES VOLTAGE CONTROLLED CURRENT SOURCES AND SWITCHING UNITS

(71) Applicant: LG Display Co., Ltd., Seoul (KR)

(72) Inventors: Hyeongwon Kang, Paju-si (KR); Hyunwoo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/072,604

(22) Filed: Mar. 6, 2025

(65) Prior Publication Data

US 2026/0050344 A1 Feb. 19, 2026

(30) Foreign Application Priority Data

Aug. 13, 2024 (KR) ........................ 10-2024-0107951

(51) Int. Cl.
*G06F 3/041* (2006.01)
*G09G 3/20* (2006.01)

(52) U.S. Cl.
CPC ...... *G06F 3/04182* (2019.05); *G06F 3/04164* (2019.05); *G09G 3/2096* (2013.01); *G09G 2310/0267* (2013.01); *G09G 2310/0275* (2013.01); *G09G 2310/08* (2013.01); *G09G 2330/021* (2013.01)

(58) Field of Classification Search
CPC ......................... G06F 3/04182; G06F 3/04164
See application file for complete search history.

(56) References Cited

U.S. PATENT DOCUMENTS

| | | | | |
|---|---|---|---|---|
| 9,465,497 | B2 | 10/2016 | Han et al. | |
| 11,257,452 | B2 | 2/2022 | Kim et al. | |
| 2015/0185913 | A1 | 7/2015 | Han et al. | |
| 2019/0385551 | A1* | 12/2019 | Kim | G02F 1/13338 |
| 2020/0210008 | A1* | 7/2020 | Lee | G06F 3/0412 |
| 2020/0210020 | A1* | 7/2020 | Lee | G06F 3/044 |
| 2020/0210046 | A1* | 7/2020 | Lee | G06F 3/044 |

FOREIGN PATENT DOCUMENTS

| | | | |
|---|---|---|---|
| KR | 10-2019-0141490 | A | 12/2019 |
| KR | 10-2207193 | B1 | 1/2021 |

* cited by examiner

*Primary Examiner* — William Boddie
*Assistant Examiner* — Andrew B Schnirel
(74) *Attorney, Agent, or Firm* — Fenwick & West LLP

(57) ABSTRACT

The embodiments relate to an input sensing device, including: a sensing panel allowing a plurality of driving lines and a plurality of sensing lines to be disposed thereon; and a sensing driving circuit configured to sense an input based on input sensing signals output from the plurality of sensing lines, and a display device including the same.

19 Claims, 19 Drawing Sheets

INPUT SENSING DEVICE AND DISPLAY DEVICE INCLUDING INPUT SENSING DEVICE WITH SENSING DRIVING CIRCUIT THAT INCLUDES VOLTAGE CONTROLLED CURRENT SOURCES AND SWITCHING UNITS

CROSS REFERENCE TO RELATED APPLICATION

The present application claims priority to Republic of Korea Patent Application No. 10-2024-0107951 filed on Aug. 13, 2024, which is hereby incorporated by reference in its entirety.

FIELD

The present disclosure relates to an input sensing device and a display device including the same.

BACKGROUND

With the development of an information society, various types of display devices have been developed. Recently, various types of display devices such as liquid crystal display (LCD), plasma display panel (PDP), and organic light emitting display (OLED) devices have been utilized.

Recently, a display device including a touch screen panel, which can sense an input of a touch, a hovering, and/or a gesture through a finger of the user or a stylus pen, etc., rather than through the conventional input methods such as use of a button, a keyboard, and a mouse, is widely used.

Such a display device includes an input sensing device for detecting whether there is an input and an input coordinate (a position of the input). The input sensing device may drive sensing electrodes disposed in the touch screen panel, and process input sensing signals output from the sensing electrodes through analog front-end circuits. The input sensing device detects input information such as whether there is an input and/or a position of the input based on an amplified signal.

While the touchscreen panel is driven, interference and noise etc. may be generated inside or outside the touchscreen panel. Such interference and noise may reduce signal-to-noise ratio of the input sensing device and deteriorate sensing sensitivity. In particular, such a problem of deteriorated sensing sensitivity may be generated more severely when sensing the hovering or gesture input, which require higher sensing sensitivity.

SUMMARY

Embodiments provide an input sensing device having an improved signal-to-noise ratio and a display device including the same.

Embodiments provide an input sensing device which removes interference and noise between a voltage controlled current source and an analog front-end circuit and a display device including the same.

Embodiments provide an input sensing device which removes interference and noise with respect to an adjacent circuit element by stabilizing a voltage of a mirror output terminal of a floated voltage controlled current source in a binding structure in which a plurality of voltage controlled current sources are connected to one analog front-end circuit, and a display device including the same.

One embodiment is an input sensing device, including: a sensing panel allowing a plurality of driving lines and a plurality of sensing lines to be disposed thereon; and a sensing driving circuit configured to sense an input based on input sensing signals output from the plurality of sensing lines.

The sensing driving circuit may include: a plurality of voltage controlled current sources connected to the plurality of sensing lines, respectively, and configured to output mirror currents with respect to the input sensing signals to mirror output terminals; a plurality of analog front end circuits configured to receive the mirror currents through input terminals and to output a differential signal corresponding to a difference of the mirror currents; and switching units configured to connect the mirror output terminals of the plurality of voltage controlled current sources to one among the input terminals of the plurality of analog front end circuits and a reference voltage.

Each of the switching units may include: a switching input terminal connected to one among the mirror output terminals; a plurality of switching output terminals, each of which being connected to one among the reference voltage and the input terminals of the analog front-end circuits; and a switching element configured to connect the switching input terminal to one among the plurality of switching output terminals.

One input terminal of the plurality of analog front-end circuits may be connected to one or a plurality of mirror output terminals according to a binding mode.

The switching unit may connect the mirror output terminals to one among the input terminals of the plurality of analog front-end circuits and the reference voltage according to the binding mode.

First group analog front-end circuits may be controlled to receive the mirror currents through the input terminals according to the binding mode, and in second group analog front end circuits, at least one among the input terminals may be controlled not to receive the mirror currents according to the binding mode.

At least one switching unit among the switching units may connect a connected mirror output terminal to one among the first group analog front-end circuits and a reference voltage according to the binding mode.

At least one switching unit among the switching units may connect a connected mirror output terminal to one among the first group analog front-end circuits or one among the second group analog front end circuits according to the binding mode.

The at least one switching unit may connect the connected mirror output terminal to the input terminal of an adjacent second group analog front-end circuit among the second group analog front end circuits according to the binding mode.

The at least one switching unit may be connected to an edge voltage controlled current sources disposed at an edge.

In a one-channel binding mode in which the one input terminal is connected to the one mirror output terminal, at least some among the switching units may connect a connected mirror output terminal to the reference voltage and remaining another among the switching units may connect the connected mirror output terminal to one among the first group analog front-end circuits.

In a multi-channel binding mode in which the one input terminal is connected to the plurality of mirror output terminals, at least some among the switching units may connect a connected mirror output terminal to one among the first group analog front-end circuits, and remaining another among the switching units may connect the connected mirror output terminal to one among the second group analog front end circuits and the reference voltage.

At least one among the voltage controlled current sources may include a first mirror output terminal and a second mirror output terminal, which output mirror currents generated by copying the input sensing signals, respectively.

In the least one among the voltage controlled current sources, the first mirror output terminal may be connected to the reference voltage through a connected switching unit in the one-channel binding mode, and in the at least one among the voltage controlled current sources, the second mirror output terminal may be connected to one among the first group analog front end circuits through the connected switching unit in the one-channel binding mode.

In the at least one among the voltage controlled current sources, the first mirror output terminal may be connected to one among the first group analog front end circuits through a connected switching unit in the multi-channel binding mode, and in the at least one among the voltage controlled current sources, the second mirror output terminal may be connected to one among the second group analog front end circuits through the connected switching unit in the multi-channel binding mode.

Another embodiment is a display device, including: a display panel allowing a plurality of pixels to be disposed thereon; a data driving circuit configured to apply a data voltage to the plurality of pixels; a scan driving circuit configured to apply a gate signal to the plurality of pixels; a timing controller configured to control an operation timing of the data driving circuit and the scan driving circuit; a sensing panel disposed on the display panel to overlap the display panel and allowing a plurality of driving lines and a plurality of sensing lines to be disposed thereon; and a sensing driving circuit configured to sense an input based on input sensing signals output from the plurality of sensing lines.

The sensing driving circuit may include: a plurality of voltage controlled current sources connected to the plurality of sensing lines, respectively, and configured to output mirror currents with respect to the input sensing signals to mirror output terminals; a plurality of analog front end circuits configured to receive the mirror currents through input terminals and to output a differential signal corresponding to a difference of the mirror currents; and switching units configured to connect the mirror output terminals of the plurality of voltage controlled current sources to one among the input terminals of the plurality of analog front end circuits and a reference voltage.

The timing controller may control one input terminal of the plurality of analog front end circuits to be connected to one or a plurality of mirror output terminals according to a binding mode, and the timing controller may transmit a control signal to the switching units so that the mirror output terminals are connected to at least one among input terminals of the plurality of analog front end circuits and the reference voltage according to the binding mode.

First group analog front-end circuits may be controlled to receive the mirror currents through the input terminals according to the binding mode, and in second group analog front end circuits, at least one among the input terminals may be controlled not to receive the mirror currents according to the binding mode.

At least one switching unit among the switching units may connect a connected mirror output terminal to one among the first group analog front-end circuits and a reference voltage according to the control signal.

At least one switching unit among the switching units may connect a connected mirror output terminal to one among the first group analog front-end circuits or one among the second group analog front end circuits according to the control signal.

The at least one switching unit may connect the connected mirror output terminal to the input terminal of an adjacent second group analog front-end circuit among the second group analog front end circuits according to the control signal.

The input sensing device and the display device including the same according to the embodiments may improve deterioration of the input sensing performance regardless of the number of bindings by preventing floating of mirror output terminals in a binding structure in which a plurality of voltage controlled current sources are connected to one analog front-end circuit, thereby removing interference and noise.

The input sensing device and the display device including the same according to the embodiments may improve the signal-to-noise ratio and improve sensing accuracy with respect to inputs by a touch, a hovering, and/or a gesture and operation stability.

The input sensing device and the display device including the same according to the embodiments may accurately sense an input of a touch, a hovering, and/or a gesture by using a change amount of the capacitance included in the input sensing signal.

The input sensing device and the display device including the same according to the embodiments may improve the sensing accuracy without increasing the size and expenses by preventing floating of the mirror output terminal through a reference signal being used inside the input sensing device.

DETAILED DESCRIPTION

Figure 1:
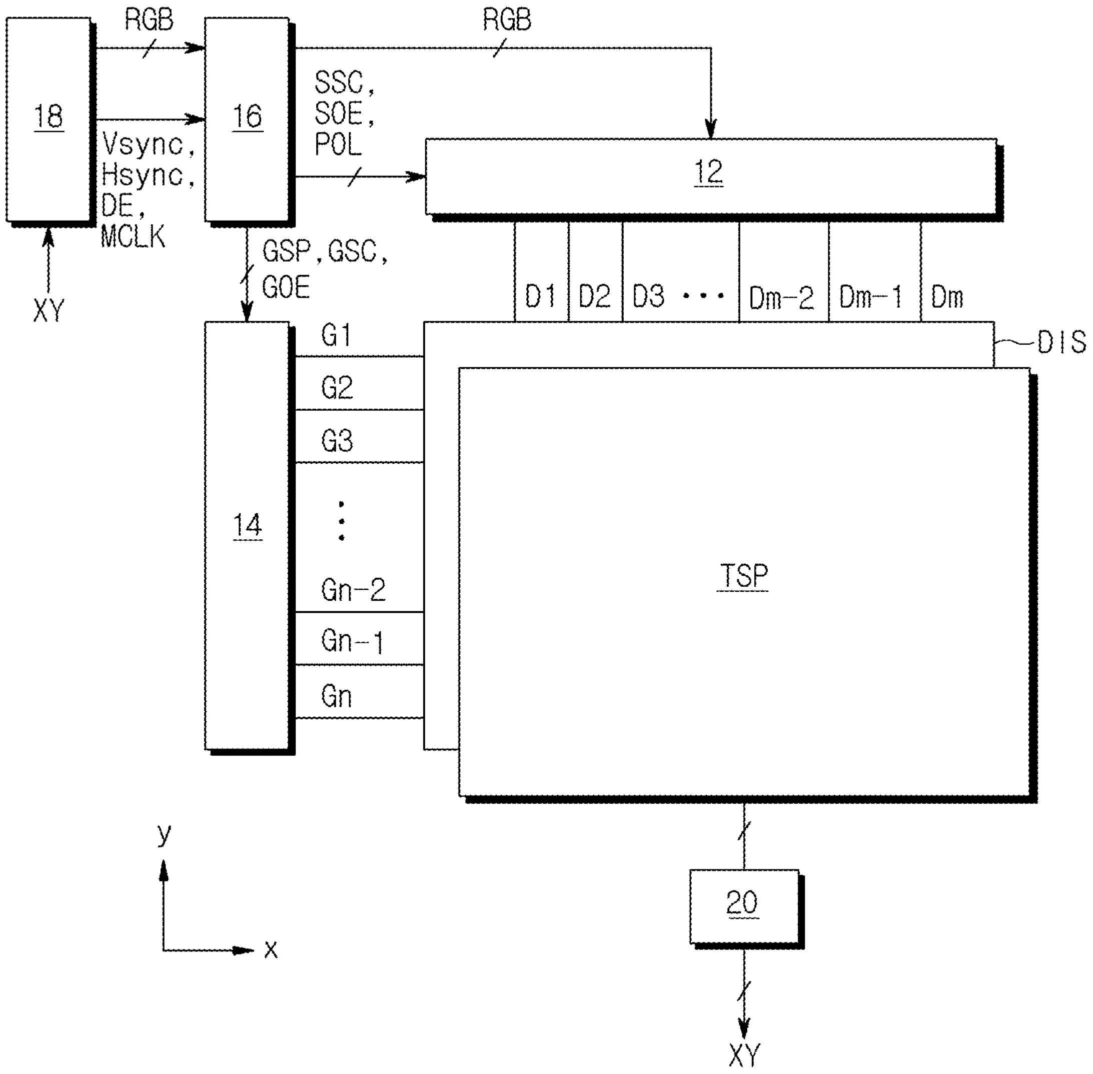
FIG. 1 is a block diagram illustrating a configuration of a display device according to an embodiment.

Hereinafter, embodiments of the invention will be described with reference to the drawings. In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the invention. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

In various embodiments of the invention, the term "include," "comprise," "including," or "comprising," specifies a property, a fixed number, a step, a process, an element and/or a component, or a combination thereof, but does not exclude presence or addition of other properties, fixed numbers, steps, processes, elements and/or components, or a combination thereof.

FIG. 1 is a block diagram illustrating a configuration of a display device according to an embodiment.

Referring to FIG. 1, a display device according to an embodiment may include a driving circuit and a display panel DIS.

The driving circuit is configured to control light emission of pixels disposed in the display panel DIS, and includes a data driving circuit 12, a scan driving circuit 14, and a timing controller 16.

The data driving circuit 12 may generate data voltages by converting digital video data RGB output from the timing controller 16 into analog voltages. The data driving circuit 12 may provide the generated data voltages to pixels of the display panel DIS through a plurality of data lines D1 to Dm.

The scan driving circuit 14 may provide a gate pulse (or a scan pulse) synchronized with the data voltage to gate lines G1 to Gn sequentially.

The timing controller 16 controls an operation timing of the data driving circuit 12 and the scan driving circuit 14 based on timing signals such as a vertical synchronization signal Vsync, a horizontal synchronization signal Hsync, a data enable signal DE, and a main clock MCLK input from a host system 18.

The timing controller 16 applies a data timing control signal based on the timing signal and applies the signal to the data driving circuit 12. The data timing control signal includes a source sampling clock SSC, a polarity control signal POL, a source output enable signal SOE, and the like.

The timing controller 16 generates a scan timing control signal based on the timing signal and applies the signal to the scan driving circuit 14. The scan timing control signal includes a start pulse GSP, a gate shift clock GSC, a gate output enable signal GOE and the like.

The host system 18 may be implemented as one among a television system, a set top box, a navigation system, a DVD player, a blue-ray player, a personal computer (PC), a home theater system, and a phone system. The host system 18 includes an SoC (System on chip) embedded with a scaler, and converts digital video data RGB of an input video into a format suitable for display in the display panel DIS. The host system 18 transmits the timing signals (Vsync, Hsync, DE, MCLK) together with digital video data to the timing controller 16. In addition, the host system 18 may implement an application program related with coordinate information XY input from a sensing driving circuit 20.

In the display panel DIS, a plurality of pixels (or, referred to as sub-pixels) are disposed. For example, the pixels may be disposed in a matrix form in the display panel DIS. The pixels disposed in one pixel row are connected to the same gate line (G1 to Gn), and the pixels PX disposed in one column are connected to the same data line (D1 to Dm). The pixels PX may emit light at luminance corresponding to the gate pulse and a data voltage supplied through the gate lines (G1 to Gn) and the data lines (D1 to Dm).

In an embodiment, each pixel PX may display one color among red, green and blue. In another embodiment, each pixel PX may display one color among cyan, magenta and yellow. In various embodiments, each pixel PX may display one color among red, green, blue and white.

The display device may further include an input sensing device. The input sensing device may include a sensing panel TSP and the sensing driving circuit 20.

The sensing panel TSP includes sensing electrodes, and includes driving lines configured to transmit a sensing driving signal to the sensing electrodes, and sensing lines configured to output an electric signal corresponding to a voltage of the sensing electrode or capacitance. The sensing electrode may be formed in a region where the driving lines and the sensing lines intersect.

The sensing panel TSP is disposed to overlap the display panel DIS, and may be attached on the display panel DIS, or may be formed between some of upper layers (e.g., a polarizer and an upper substrate) of the display panel DIS. Alternatively, together with the pixel array, the sensing electrodes of the sensing panel TSP may be formed on a lower substrate of the sensing panel TSP, and may be embedded as an in-cell type in the display panel DIS.

The sensing driving circuit 20 senses a change amount of the capacitance in the sensing electrode so as to determine whether input of a conductive material such as a finger occurs and where the input thereof occurs. The sensing driving circuit 20 applies the sensing driving signal to the driving lines, and may receive the input sensing signal output from the sensing lines.

The sensing driving circuit 20 determines that an input occurs when the change amount of the capacitance of the sensing electrode is greater than a threshold value by using the input sensing signal, and transmits an input report including coordinate information (XY) and the like of the input to the host system 18.

In an embodiment, the display device may be a rigid display device or a flexible display device. For example, the display device may be a foldable display device, a bendable display device, a rollable display device, a stretchable display device, and the like.

Figure 2:
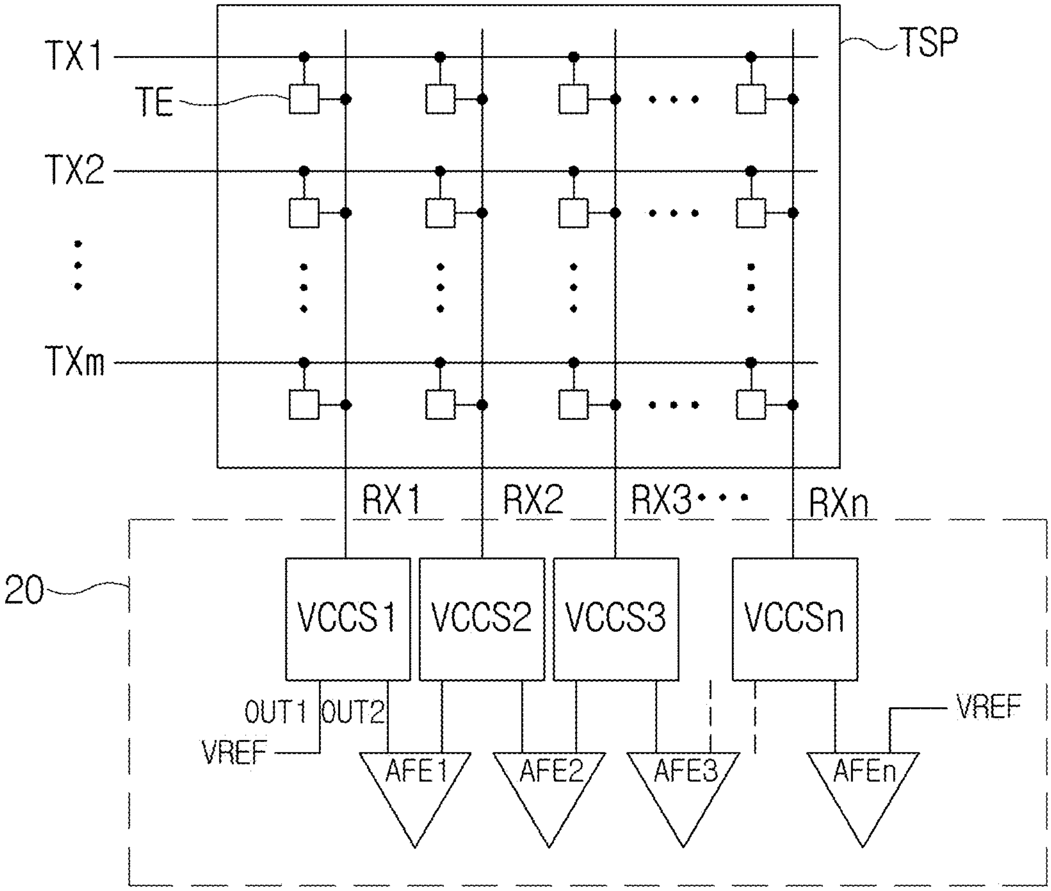
FIG. 2 is a plan view illustrating an input sensing device according to a first embodiment.

FIG. 2 is a plan view illustrating an input sensing device according to a first embodiment.

Referring to FIG. 2, the input sensing device may include a sensing panel TSP and the sensing driving circuit 20.

The sensing panel TSP includes driving lines (TX1 to TXm, m is a natural number equal to or greater than 2) configured to transmit a sensing driving signal, sensing lines (RX1 to RXn, n is a natural number equal to or greater than 2), and sensing electrodes TE. The driving lines (TX1 to TXm) and the sensing lines (RX1 to RXn) intersect, with an insulation layer (or a dielectric layer) interposed therebetween.

In FIG. 2, the sensing panel TSP is illustrated as a touch screen panel of a mutual capacitance manner which includes the driving lines (TX1 to TXm) and the sensing lines (105-1 to 105-*n*). However, the present embodiment is not limited thereto, and the sensing panel TSP may be a touch screen panel in a self-capacitance manner in which sensing of the change amount of the capacitance generated by supply of the sensing driving signal, a touch or an approach of a hand of the user, or a stylus pen is implemented through one sensing line.

The sensing driving circuit 20 is connected to the driving lines (TX1 to TXm) and the sensing lines (RX1 to RXn). The sensing driving circuit 20 may supply the sensing driving signal to the driving lines (TX1 to TXm), and receive the input sensing signal from the sensing lines (RX1 to RXn) in synchronization with the sensing driving signal. The sensing driving signal may be a signal in various shapes such as a pulse in the shape of a square wave, a sine wave, a triangle wave, and the like.

The sensing driving circuit 20 may include analog front-end circuits (AFE1 to AFEn or an analog front end) and voltage controlled current sources (VCCS1 to VCCSn) connected to the sensing lines (RX1 to RXn).

The voltage controlled current sources (VCCS1 to VCCSn) may amplify an input sensing signal input from the sensing lines (RX1 to RXn) by as big as a certain size, and generate a pair of mirror currents generated by copying the amplified input sensing signal. The voltage controlled current sources (VCCS1 to VCCSn) may output the generated pair of mirror currents through corresponding mirror output terminals (OUT1 and OUT2), respectively.

In an embodiment, the voltage controlled current sources (VCCCS1 to VCCSn) may be connected to the sensing lines (RX1 to RXn) on a one-to-one basis. However, the embodiment is not limited thereto.

In an embodiment, the voltage controlled current sources (VCCCS1 to VCCSn) may further include a noise removal circuit configured to remove common noise from a current signal. The overall configuration of the voltage controlled current sources (VCCCS1 to VCCSn) may be described with reference to FIG. 3.

The analog front-end circuits (AFE1 to AFEn) may generate and output a differential signal corresponding to a difference of the mirror currents output from the voltage controlled current sources (VCCS1 to VCCSn). In more detail, each of the analog front-end circuits (AFE1 to AFEn) may be connected to two voltage controlled current sources (VCCS1 to VCCSn) adjacent to each other. In addition, each of the analog front-end circuits (AFE1 to AFEn) may output a differential signal in an analog format corresponding to a difference of the mirror currents output from two voltage controlled current sources (VCCS1 to VCCSn).

For example, a first analog front-end circuit (AFE1) may be electrically connected to a first voltage controlled current source (VCCS1) and a second voltage controlled current source (VCCS2), and may output a differential signal corresponding to a difference of the mirror currents output from the first voltage controlled current source (VCCS1) and the second voltage controlled current source (VCCS2).

Similarly, a second analog front end circuit (AFE2) may be electrically connected to a second voltage controlled current source (VCCS2) and a third voltage controlled current source (VCCS3), and may output a differential signal corresponding to a difference between the mirror currents output from the second voltage controlled current source (VCCS2) and the third voltage controlled current source (VCCS3).

The analog front-end circuits (AFE1 to AFEn) may be configured to include an amplifier, a filter, and the like. For example, the analog front-end circuits (AFE1 to AFEn) may be implemented as a differential analog front end circuit which includes a differential amplifier. In such an embodiment, the analog front-end circuits (AFE1 to AFEn) may amplify a difference between two input mirror currents and output it as a differential signal.

Such an input sensing device may not only considerably reduce a sensing time compared to a time sequence manner in which each of sensing lines (RX1 to RXn) is sensed sequentially, but also reduce deterioration of signal quality caused by the difference in the sensing time. In addition, if using the manner of amplifying the differential signal, the sensing sensitivity may be improved compared to a sensing manner of using a single signal.

As illustrated, a first mirror output terminal (OUT1), among two mirror output terminals (OUT1 and OUT2) for the first voltage controlled current source (VCCS1) to output each of the pair of mirror currents, is not connected to the analog front-end circuits (AFE1 to AFEn). Instead, the first mirror output terminal (OUT1) of the first voltage controlled current source (VCCS1) may be connected to a reference voltage (VREF).

Further, one input terminal of the last analog front-end circuit (AFEn) is electrically connected to an n-th voltage controlled current source (VCCSn), and the other input terminal thereof is not connected to the voltage controlled current sources (VCCS1 to VCCSn). Instead, the other input terminal thereof not connected to the voltage controlled current sources (VCCS1 to VCCSn) may be connected to the reference voltage (VREF).

In an embodiment, when the input sensing device is a touch screen panel in a mutual capacitance manner, the reference voltage (VREF) may be a DC voltage. At this instance, a size Q of the differential signal detected from the analog front-end circuit (AFE1 to AFEn) may be expressed in an equation 1 below.

$$Q = VTX \times \Delta Cm \quad \text{[Equation 1]}$$

Here, VTX is a voltage of the driving line (TX1 to TXm), that is, a voltage of the sensing driving signal applied to the driving line (TX1 to TXm), and ΔCm is a change amount of the mutual capacitance.

In another embodiment, when the input sensing device is a touch screen panel in a mutual capacitance manner, the reference voltage (VREF) may be a pulse voltage. At this instance, a size Q of the differential signal may be expressed as an equation 2 below.

$$Q=V\text{REF(Pulse)}\times C\text{finger} \quad \text{[Equation 2]}$$

Here, VREF (Pulse) is a size of a pulse voltage, and Cfinger is a change amount of self-capacitance.

In the illustrated example, one input terminal of one analog front-end circuit (AFE1 to AFEn) is connected to one mirror output terminal (OUT1 and OUT2) of the voltage controlled current sources (VCCS1 to VCCSn). This kind of structure may be referred to as a one channel binding mode.

Regarding this input sensing device, when there is no input generated, a current input to the sensing driving circuit 20 is 0, and when an amount of charge of the sensing panel TSP is transitioned as an input is generated, a current corresponding to the change amount of the capacitance is input to the sensing driving circuit 20. Therefore, during when there is no input generated, an ideal change amount ΔQ of a size of the differential signal output from the analog front-end circuits (AFE1 to AFEn−1) is 0. However, in case of the last analog front-end circuit (AFEn) which receives the reference voltage (VREF), a capacitance difference is generated between the input terminals, and as a result, an offset may be generated, and a problem of deteriorated sensitivity and input accuracy of the input may occur.

In order to solve such a problem, the sensing driving circuit 20 may be formed in a structure in which a plurality of voltage controlled current sources (VCCS1 to VCCSn) are bound to one analog front-end circuit (AFE1 to AFEn). Such a structure will be described in more detail referring to FIGS. 5 to 7 below.

Figure 3:
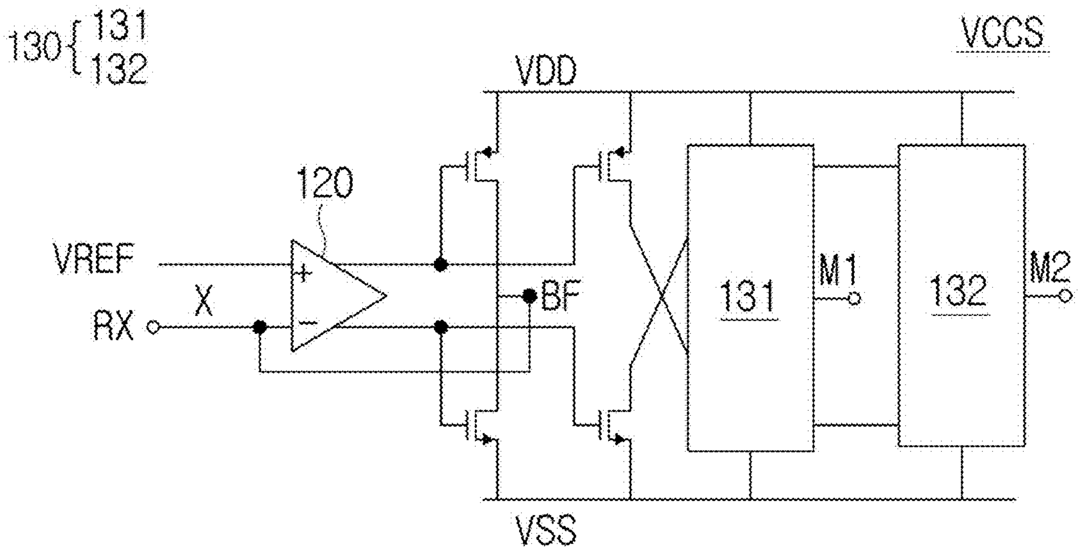
FIG. 3 is a view illustrating a configuration of a voltage controlled current source illustrated in FIG. 2 according to an embodiment.

FIG. 3 is a view illustrating a configuration of a voltage controlled current source illustrated in FIG. 2 according to an embodiment.

Referring to FIG. 3, the voltage controlled current source (VCCS) according to an embodiment includes a buffer 120 and a current mirroring unit 130.

The buffer 120 may buffer a difference between an input sensing signal X received through the sensing line RX and a certain reference voltage (VREF), and output the buffered buffer signal BF. The output terminal outputting the buffer signal BF output from the buffer 120 is connected to an input terminal of the buffer 120 receiving the input sensing signal X.

In an embodiment, the buffer 120 may be implemented as an operational amplifier having a voltage gain of 1. In such an embodiment, the buffer 120 may be a unit gain buffer, a unit gain amplifier, or a buffer amplifier.

In an embodiment, the buffer 120 may be connected to the sensing line RX on a one-to-one basis. When the buffer 120 is directly connected to the sensing line RX on a one-to-one basis, a loss of the input sensing signal X received by the buffer 120 is reduced, thereby an input sensing signal having a high signal-to-noise ratio can be obtained. However, the present embodiment is not limited thereto, and in various embodiments, the buffer 120 may be connected to at least one or more sensing lines RX through a MUX circuit and the like.

In addition, in a structure in which the buffer 120 uses the reference voltage (VREF), the reference voltage (VREF) may be used by both a non-connecting input/output terminal of the analog front end circuit (AFE) and the voltage controlled current source (VCCS), thereby algorithm processing with respect to the input sensing signal X is made easy, and a size, complexity, and power consumption of the input sensing device may be reduced.

The current mirroring unit 130 may convert a buffer signal BF output from the buffer 120 into a mirror current, and may output the converted mirror current to the mirror output terminals. In an embodiment, the current mirroring unit 130 (e.g., a current mirror circuit) may be a charge-to-current converter which converts an input electric charge into an output current. The current mirroring unit 130 may generate a pair of mirror currents (M1 and M2) by copying the buffer signal BF output from the buffer 120.

In an embodiment, the current mirroring unit 130 may include a plurality of output mirror circuits 131 and 132. The first mirror circuit 131 may output a first mirror current M1 among the pair of mirror currents (M1 and M2), and the second output mirror circuit 132 may output a second mirror current M2 there among.

A current amount of the two (a pair) mirror currents (M1 and M2) may be the same. The current amount of the mirror currents (M1 and M2) may be adjusted through a control signal.

A detailed configuration of the current mirroring unit 130 will be described referring to FIG. 4 below.

Figure 4:
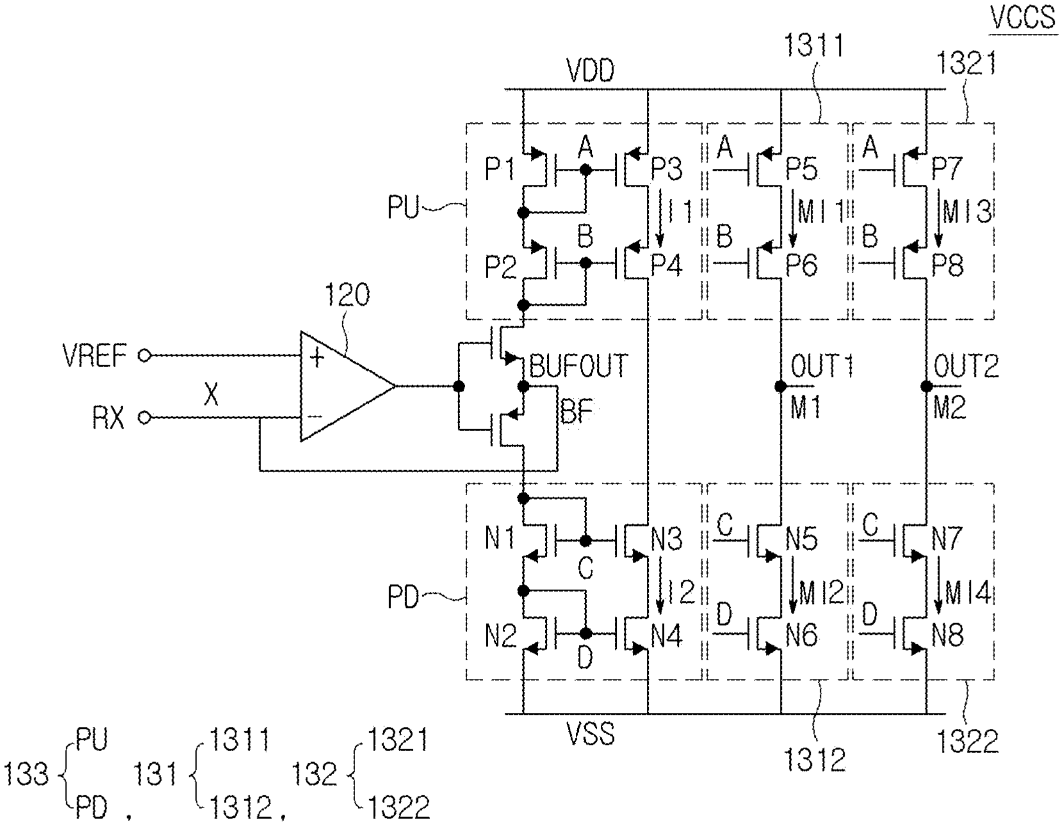
FIG. 4 is a view illustrating a configuration of a current mirror unit illustrated in FIG. 3 according to an embodiment.

FIG. 4 is a view illustrating a configuration of the current mirror unit illustrated in FIG. 3 according to an embodiment.

Referring to FIG. 4, the voltage controlled current source VCCS includes the buffer 120 and the current mirroring unit 130.

The current mirroring unit 130 may include an input mirror circuit 133 and the plurality of output mirror circuits 131 and 132.

The input mirror circuit 133 is connected to an output terminal BUFOUT of the buffer 120. The output terminal BUFOUT of the buffer 120 is connected to an input terminal of the buffer 120 to which the input sensing signal X is input. The input mirror circuit 133 includes a pull-up circuit PU and a pull-down circuit PD. Each of the pull-up circuit PU and the pull-down circuit PD may be implemented in a cascode configuration.

The pull-up circuit PU may include pairs of PMOS transistors (P1 and P2, P3 and P4) connected in series between a first power line (or a power node) supplying a first power VDD and the output terminal BUFOUT. When the pull-up operates (or the current sourcing operates), a first input current I1 may flow toward the output terminal BUFOUT through the pull-up circuit PU.

The pull-down circuit PD may include pairs of NMOS transistors (N1 and N2, N3 and N4) connected in series between the output terminal BUFOUT and a second power line supplying a second power VSS which is a lower voltage than the first power VDD. When the pull-down operates (or the current sinking operates), a second input current I2 may flow toward the second power line through the pull-down circuit PD.

Each of the output mirror circuits 131 and 132 may include first mirror circuits 1311 and 1321 and second mirror circuits 1312 and 1322. The pull-up circuit PU and the first mirror circuits 1311 and 1321 may form a current mirror. In addition, the pull-down circuit PD and the second mirror circuits 1312 and 1322 may form a current mirror.

The first output mirror circuit 131 may include a first mirror circuit 1311 and a second mirror circuit 1312.

The first mirror circuit 1311 may be implemented in a PMOS cascode current mirror circuit, and may generate a first output current MI1 by mirroring the first input current I1. The first mirror circuit 1311 may include PMOS transistors P5 and P6 connected in series between a first power line supplying the first power VDD and a first mirror output terminal (OUT1). When the pull-up operates (or the current sourcing operates), the first output current MI1 may flow to the first mirror output terminal (OUT1) through the first mirror circuit 1311.

The second mirror circuit 1312 may be implemented as an NMOS cascode current mirror circuit, and may generate a second output current MI2 by mirroring the second input current I2. The second mirror circuit 1312 may include NMOS transistors N5 and N6 connected in series between the first mirror output terminal (OUT1) and the second power line. When the pull-down operates (or the current sinking operates), the second output current MI2 may flow to the second power line through the second mirror circuit 1312.

As a result, the first mirror current M1 corresponding to a difference between the first output current MI1 and the second output current MI2 may be output through the first mirror output terminal (OUT1).

The second output mirror circuit 132 may include a first mirror circuit 1321 and a second mirror circuit 1322.

The first mirror circuit 1321 may be implemented as a PMOS cascode current mirror circuit, and may generate a third output current MI3 by mirroring the first input current I1. The first mirror circuit 1321 may include PMOS transistors P7 and P8 connected in series between the first power line supplying the first power VDD and the second mirror output terminal (OUT2). When the pull-up operates (or the current sourcing operates), the third output current MI3 may flow to the second mirror output terminal (OUT2) through the first mirror circuit 1321.

The second mirror circuit 1322 may be implemented as an NMOS cascode current mirror circuit, and may generate a fourth output current MI4 by mirroring the second input current I2. The second mirror circuit 1322 may include NMOS transistors N7 and N8 connected in series between the second mirror output terminal (OUT2) and a second power line VSS. When the pull-down operates (or the current sinking operates), the fourth output current MI4 may flow to the second power line VSS.

As a result, the second mirror current M2 corresponding to a difference between the third output current MI3 and the fourth output current MI4 may be output through the second mirror output terminal (OUT2).

In an embodiment, an amount of a current of the first input current I1 may be greater than an amount of a current of each of the output currents MI and MI3, and an amount of current of the first output current MI1 and an amount of a current of the third output current MI3 may be the same.

For example, when it is assumed that a length of a channel of each of the PMOS transistors P1, P2, P3, P4, P5, P6, P7 and P8 is the same, a width of a channel of each of the PMOS transistors P1 and P2 of the pull-up circuit PU is the same, a width of a channel of each of the PMOS transistors P5, P6, P7 and P8 of the first mirror circuits 1311 and 1321 is the same, and a width of a channel of the first PMOS transistor P1 of the pull-up circuit PU is K times (K is a natural number equal to or greater than 2) a width of a channel of the fifth PMOS transistor P5 of the first mirror circuit 1311, an amount of each output current MI1 and MI3 is 1/K times an amount of the first input current I1. In such an embodiment, by adjusting a width of a channel of each of the PMOS transistors P5, P6, P7 and P8 of the first mirror circuits 1311 and 1321 using the control signals A and B, an amount of each output current MI1 and MI3 may be adjusted.

In an embodiment, an amount of a current of the second input current I2 may be greater than an amount of a current of each of the output currents M2 and MI4, and an amount of current of the second output current MI2 and an amount of a current of the fourth output current MI4 may be the same.

For example, when it is assumed that a length of a channel of each of the NMOS transistors N1, N2, N3, N4, N5, N6, N7 and N8 is the same, a width of a channel of each of the NMOS transistors N1 and N2 of the pull-down circuit PD is the same, a width of a channel of each of the NMOS transistors N5, N6, N7 and N8 of the second mirror circuits 1312 and 1322 is the same, and a width of a channel of the first NMOS transistor N1 of the pull-down circuit PD is K times a width of a channel of the fifth NMOS transistor N5 of the second mirror circuit 1312, an amount of each output current MI2 and MI4 is 1/K times an amount of the second input current I2. In such an embodiment, by adjusting a width of a channel of each of the NMOS transistors N5, N6, N7 and N8 of the second mirror circuits 1312 and 1322 using the control signals C and D, an amount of each output current MI2 and MI4 may be adjusted.

As illustrated, because the input mirror circuit 133 and the output mirror circuits 131 and 132 are implemented as the cascode current mirror circuits, mismatch of the DC currents of the MOS transistors configuring each of the output mirror circuits 131 and 132 may be minimized. This may minimize the DC currents accumulated in the analog front end circuits (AFE1 to AFEn, FIG. 2) connected to a rear end, thereby allowing to efficiently utilize an output range of the analog front end circuits (AFE1 to AFEn) and to remove distortions of the differential signals.

Figure 5:
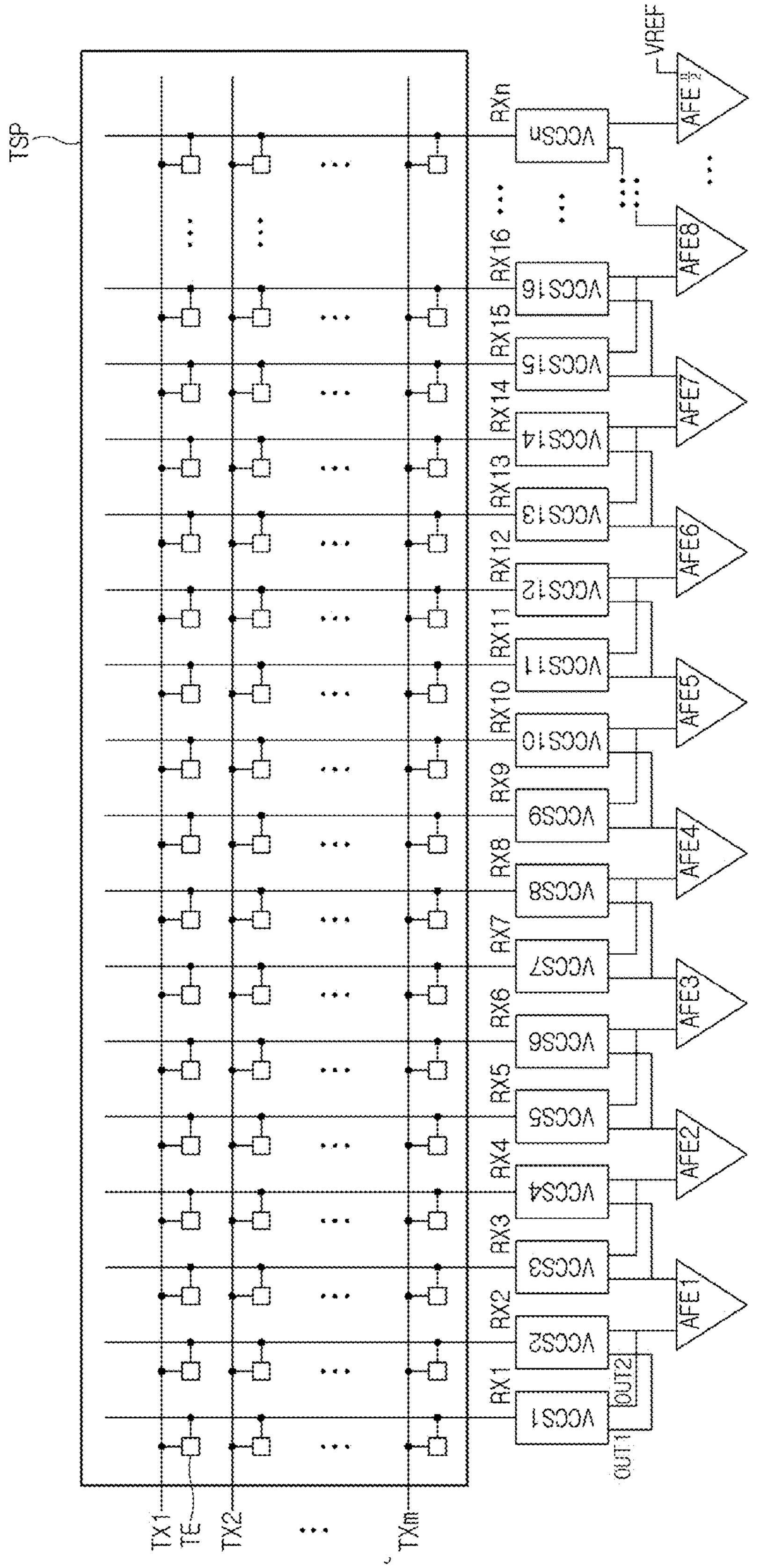
FIG. 5 is a plan view illustrating an input sensing device according to a second embodiment.

FIG. 5 is a plan view illustrating an input sensing device according to a second embodiment.

Referring to FIG. 5, the input sensing device may include the sensing panel TSP and the sensing driving circuit 20.

In an embodiment of FIG. 5, one input terminal of each of the analog front-end circuits (AFE1 to AFE(n/2)) is bound to mirror output terminals of two adjacent voltage controlled current sources (VCCS1 to VCCSn). Such a structure may be referred to as a two-channel binding mode. Each of the analog front end circuits (AFE1 to AFE(n/2)) has two input terminals, and therefore, one analog front end circuit is bound to four adjacent voltage controlled current sources (VCCS1 to VCCSn). Therefore, each of the analog front-end circuits (AFE1 to AFE(n/2)) may output a differential signal in an analog format corresponding to a difference of the mirror currents output from the four voltage controlled current sources (VCCS1 to VCCSn).

For example, the first analog front end circuit AFE1 may be electrically connected to the first voltage controlled current source VCCS1, the second voltage controlled current source VCCS2, the third voltage controlled current source VCCS3, and a fourth voltage controlled current source VCCS4, and may output a differential signal corresponding to a difference between a mirror current output from the first voltage controlled current source VCCS1 and the second voltage controlled current source VCCS2, and a mirror current output from the third voltage controlled current source VCCS3 and the fourth voltage controlled current source VCCS4.

The second analog front end circuit AFE2 is electrically connected to the third voltage controlled current source VCCS3, the fourth voltage controlled current source VCCS4, a fifth voltage controlled current source VCCS5, and a sixth voltage controlled current source VCCS6, and may output a differential signal corresponding to a difference between a mirror current output from the third voltage controlled current source VCCS3, and the fourth voltage controlled current source VCCS4, and a mirror current output from the fifth voltage controlled current source VCCS5 and the sixth voltage controlled current source VCCS6.

Such an input sensing device can increase the current amount input to the analog front-end circuits (AFE1 to AFE(n/2)), and allow a difference between the mirror currents output from the adjacent voltage controlled current sources (VCCS1 to VCCSn) to be accurately detected, thereby improving the sensing accuracy of the input. Therefore, a small input such as a hovering input having a small change of the capacitance may be accurately detected. In addition, such an input sensing device reduces the quantity of the analog front-end circuits (AFE1 to AFE(n/2)), thereby the input sensing device can be made compact and thin.

As such, when a plurality of voltage controlled current sources (VCCS1 to VCCSn) are bound to one analog front end circuit (AFE1 to AFE(n/2)), the edge voltage controlled current sources disposed at the edge, for example, the first mirror output terminal (OUT1) of the first and the second voltage controlled current sources VCCS1 and VCCS2 gets into a floating state in which there is no connection to the analog front end circuits (AFE1 to AFE(n/2)).

Such disconnected mirror output terminals are in a high impedance (High-Z) state and influenced by a neighboring circuit element, and may get into an unstable state in which they swing between the first voltage VDD (FIG. 4) and the second voltage VSS (FIG. 4) according to a pulse cycle of the reference voltage (VREF) or the sensing driving signal. Such an unstable state of the disconnected mirror output terminals may deteriorate the sensing accuracy of the input by generating noise in a neighboring analog front-end circuit.

The quantity of the disconnected mirror output terminals being floated increases as the number of bindings of the voltage controlled current sources (VCCS1 to VCCSn) increases. This will be described in more detail below.

Figure 6:
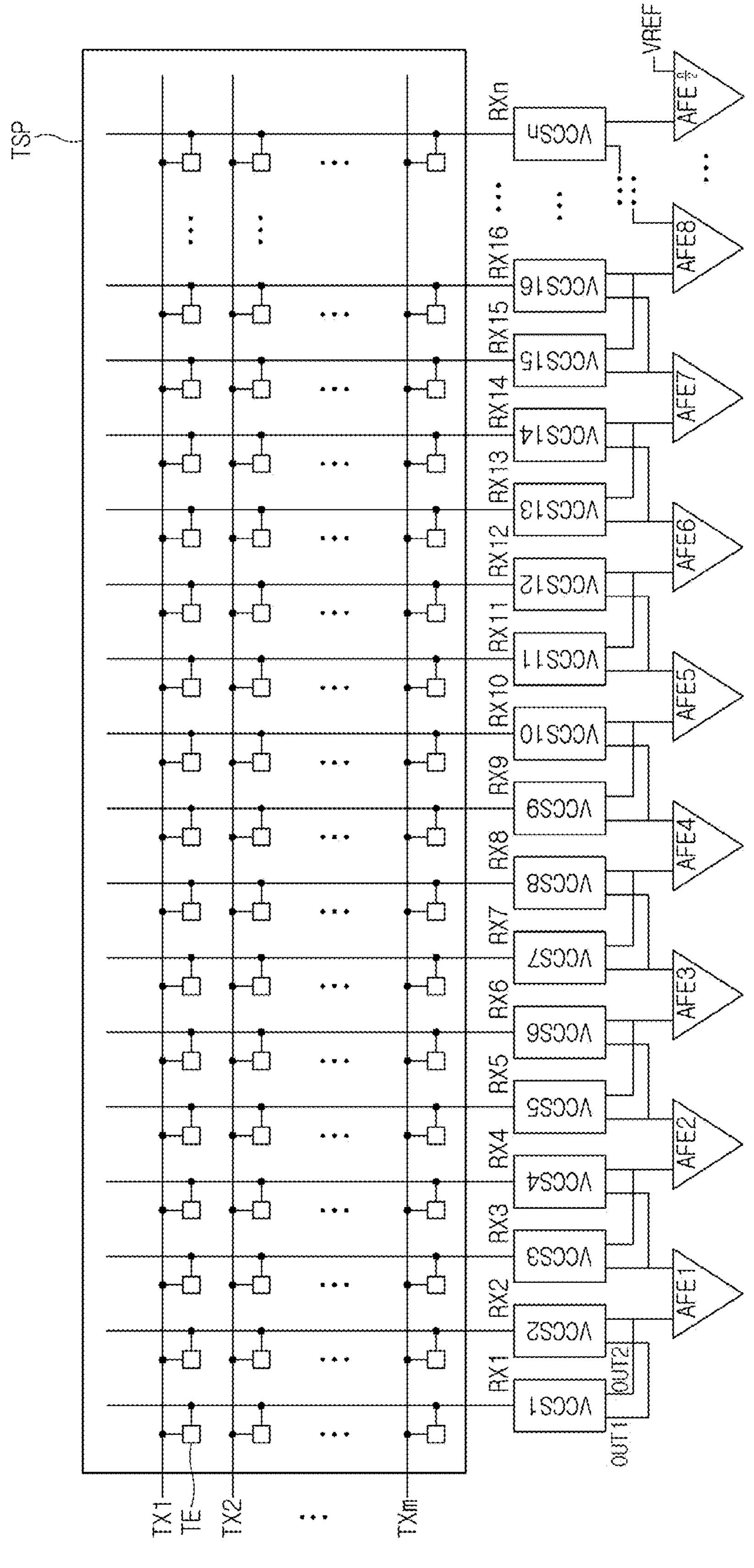
FIG. 6 is a plan view illustrating an input sensing device according to a third embodiment.

FIG. 6 is a plan view illustrating an input sensing device according to a third embodiment.

Referring to FIG. 6, the input sensing device may include the sensing panel TSP and the sensing driving circuit 20.

In an embodiment in FIG. 6, one input terminal of the analog front-end circuits (AFE1 to AFE(n/4)) is bound to the mirror output terminals of four adjacent voltage controlled current sources (VCCS1 to VCCSn). Such a structure may be referred to as a four-channel binding mode. Each of the analog front end circuits (AFE1 to AFE(n/4)) has two input terminals, and therefore, one analog front end circuit is bound to eight adjacent voltage controlled current sources (VCCS1 to VCCSn). Therefore, each of the analog front-end circuits (AFE1 to AFE(n/4)) may output a differential signal in an analog format corresponding to a difference of the mirror currents output from the eight voltage controlled current sources (VCCS1 to VCCSn).

For example, the first analog front end circuit (AFE1) may be electrically connected to a first voltage controlled current source (VCCS1) to an eighth voltage controlled current source (VCCS8), and may output a differential signal corresponding to a difference between the mirror currents output from the first voltage controlled current source (VCCS1) to the fourth voltage controlled current source (VCCS4), and the mirror currents output from the fifth voltage controlled current source (VCCS5) to the eighth voltage controlled current source (VCCS8).

The second analog front end circuit (AFE2) may be electrically connected to the fifth voltage controlled current source to a twelfth voltage controlled current source (VCCS5 to VCCS12), and may output a differential signal corresponding to a difference between the mirror currents output from the ninth voltage controlled current source to the twelfth voltage controlled current source (VCCS9 to VCCS12), and the mirror currents output from the fifth voltage controlled current source to the eighth voltage controlled current source (VCCS5 to VCCS8).

In such an embodiment, the edge voltage controlled current sources disposed at the edge, for example, the first mirror output terminals (OUT1) of the first to the fourth voltage controlled current sources (VCCS1 to VCCS4) get into a floating state in which there is no connection to the analog front-end circuits (AFE1 to AFE(n/4)), thereby generating noise to neighboring circuit elements.

Figure 7:
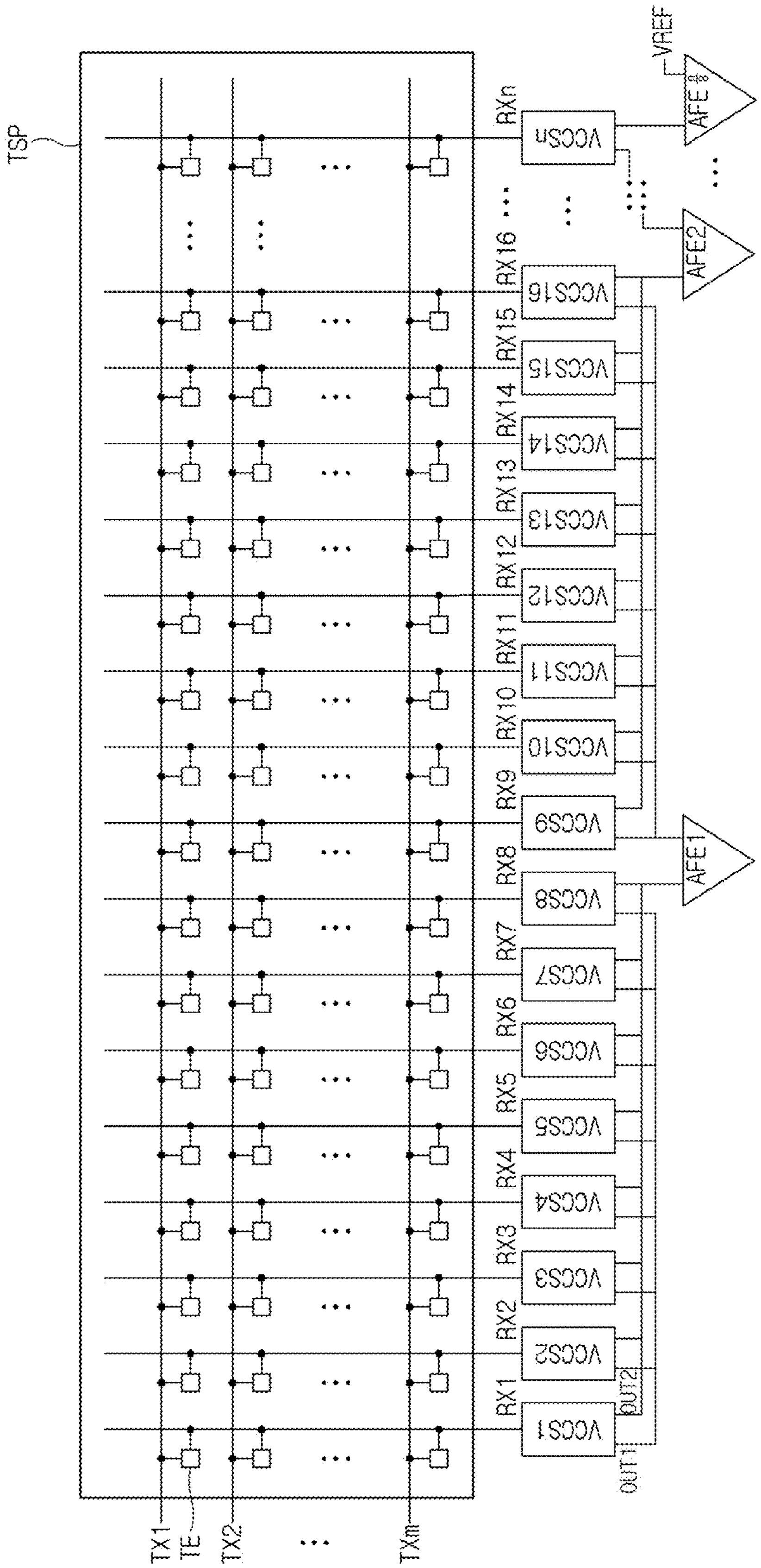
FIG. 7 is a plan view illustrating an input sensing device according to a fourth embodiment.

FIG. 7 is a plan view illustrating an input sensing device according to a fourth embodiment.

Referring to FIG. 7, the input sensing device may include the sensing panel TSP and the sensing driving circuit 20.

In an embodiment in FIG. 7, one input terminal of the analog front-end circuits (AFE1 to AFE(n/8)) is bound to the mirror output terminals of eight adjacent voltage controlled current sources (VCCS1 to VCCSn). Such a structure may be referred to as an eight-channel binding mode. Each of the analog front-end circuits (AFE1 to AFE(n/8)) has two input terminals, and therefore, one analog front end circuit is bound to sixteen adjacent voltage controlled current sources (VCCS1 to VCCSn). Therefore, each of the analog front-end circuits (AFE1 to AFE(n/8)) may output a differential signal in an analog format corresponding to a difference of the mirror currents output from the sixteen voltage controlled current sources (VCCS1 to VCCSn).

In such an embodiment, the edge voltage controlled current sources disposed at the edge, for example, the first mirror output terminals (OUT1) of the first to the eighth voltage controlled current sources (VCCS1 to VCCS8) get into a floating state in which there is no connection to the analog front-end circuits (AFE1 to AFE(n/8)), thereby generating noise to neighboring circuit elements.

Hereinafter, a structure of the sensing driving circuit 20, capable of preventing noise generated from the above-described floating mirror output terminal and improving the sensing accuracy of the input having a small change of the capacitance such as the touch input, in particular, the hovering input, will be described.

Figure 8:
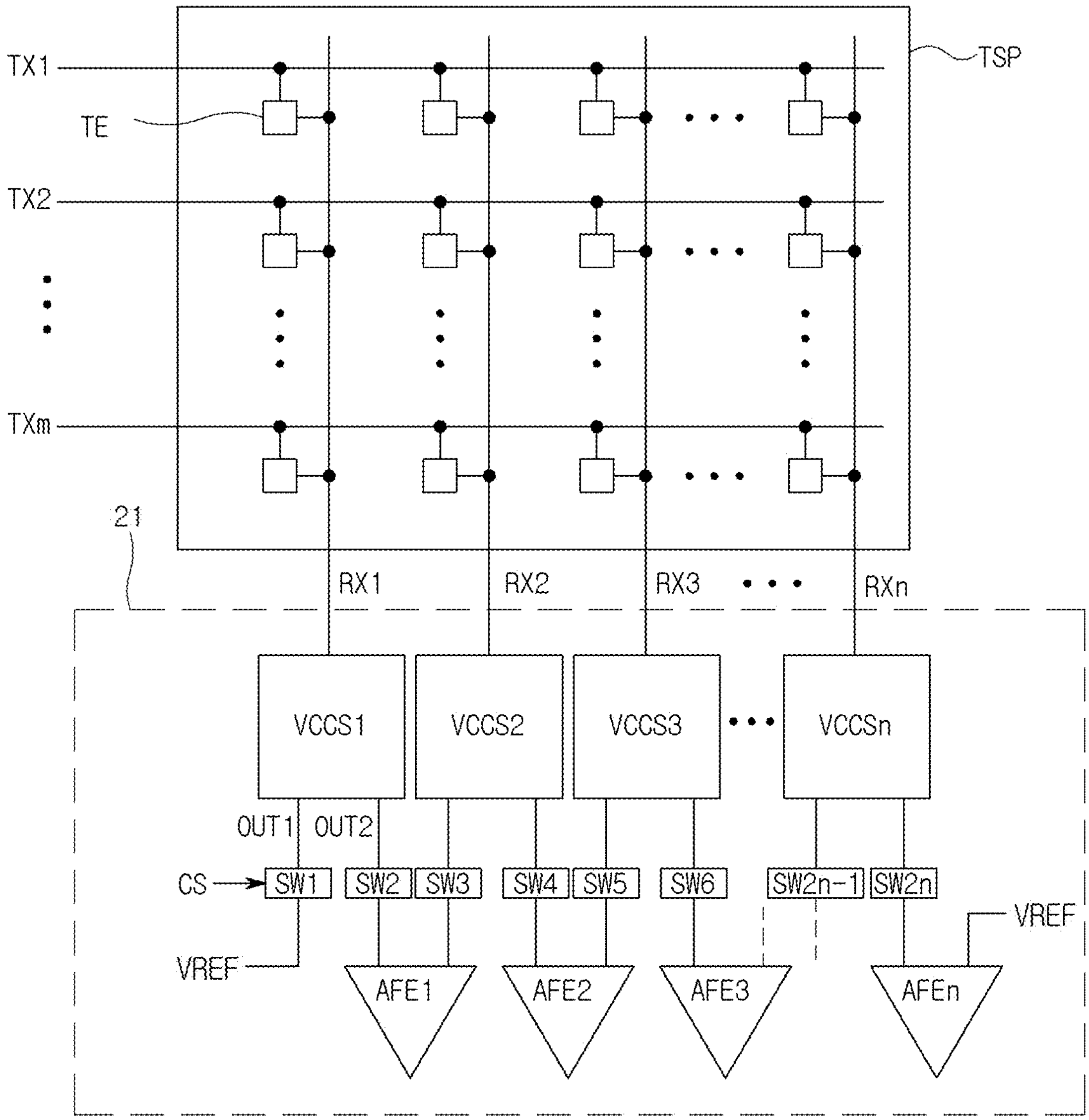
FIG. 8 is a plan view illustrating an input sensing device according to a fifth embodiment.

FIG. 8 is a plan view illustrating an input sensing device according to a fifth embodiment.

Referring to FIG. 8, the input sensing device may include the sensing panel TSP and a sensing driving circuit 21. In an embedment of FIG. 8, the input sensing device is configured to be capable of operating in various binding modes. In such an embodiment, according to the binding mode, the first group analog front-end circuits among the analog front end circuits (AFE1 to AFEn) of the sensing driving circuit 21 may be activated, and the second group analog front end circuits thereof may be deactivated. Here, being activated may mean a state capable of receiving the mirror currents through two input terminals and outputting a differential signal, and being deactivated may mean a state incapable of outputting the differential signal because the mirror current is not received through at least one among the two input terminals.

For example, in a two-channel binding mode, the first group analog front-end circuits may be even-numbered analog front end circuits (AFE2, AFE4, . . . , AFEn), and the second group analog front end circuits may be odd-numbered analog front end circuits (AFE1, AFE3, . . . , AFEn−1).

Alternatively, for example, in a four-channel binding mode, the first group analog front end circuits may be 4k-th analog front end circuits (AFE4, AFE8, . . . , AFEn)(k is a natural number), and the second group analog front end circuits may be the remaining analog front end circuits (AFE1, AFE2, AFE3, . . . , AFEn−1).

Alternatively, for example, in an eight-channel binding mode, the first group analog front end circuits may be 8k-th analog front end circuits (AFE8 . . . , AFEn)(k is a natural number), and the second group analog front end circuits may be the remaining analog front end circuits (AFE1, AFE2, AFE3, AFE4, AFE5, AFE6, AFE7 . . . , AFEn−1).

Compared to the embodiment in FIG. 2, the input sensing device according to the embodiment of FIG. 8 further includes switching units (SW1 to SW2*n*). The switching units (SW1 to SW2*n*) are disposed between the voltage controlled current sources (VCCS1 to VCCSn) and the analog front end circuits (AFE1 to AFEn), and control the connection between the voltage controlled current sources (VCCS1 to VCCSn) and the analog front end circuits (AFE1 to AFEn). For example, the switching units (SW1 to SW2*n*) may connect the mirror output terminals (OUT1 and OUT2) to the input terminal of the analog front end circuits (AFE1 to AFEn) or the reference voltage (VREF) according to the quantity of the voltage controlled current sources (VCCS1 to VCCSn) (that is, the binding mode) bound to one analog front end circuit (AFE1 to AFEn).

For example, the switching units (SW1 to SW2*n*) may connect the mirror output terminals (OUT1 and OUT2) connected to the deactivated analog front end circuit (AFE1 to AFEn) to the input terminal of the adjacent analog front end circuits (AFE1 to AFEn) or the reference voltage (VREF). In addition, the switching units (SW1 to SW2*n*) may connect the mirror output terminals (OUT1 and OUT2) connected to the activated analog front-end circuit (AFE1 to AFEn) to the input terminal of activated analog front end circuits (AFE1 to AFEn) corresponding thereto.

Such switching units (SW1 to SW2*n*) may include a switching element for connecting the mirror output terminals (OUT1 and OUT2) of the analog front-end circuits (AFE1 to AFEn) to one among the input terminal of the voltage controlled current sources (VCCS1 to VCCSn) and a reference signal line to which the reference voltage (VREF) is applied. The switching element may be turned on or turned off based on a switching control signal CS input from the timing controller 10 (FIG. 1) and the like. The switching control signal CS is a signal which includes, for example, information of the binding mode, and may be configured to control a connection state of the switching element.

Hereinafter, a configuration of the switching unit (SW1 to SW2*n*) in greater detail will be described.

Figure 9:
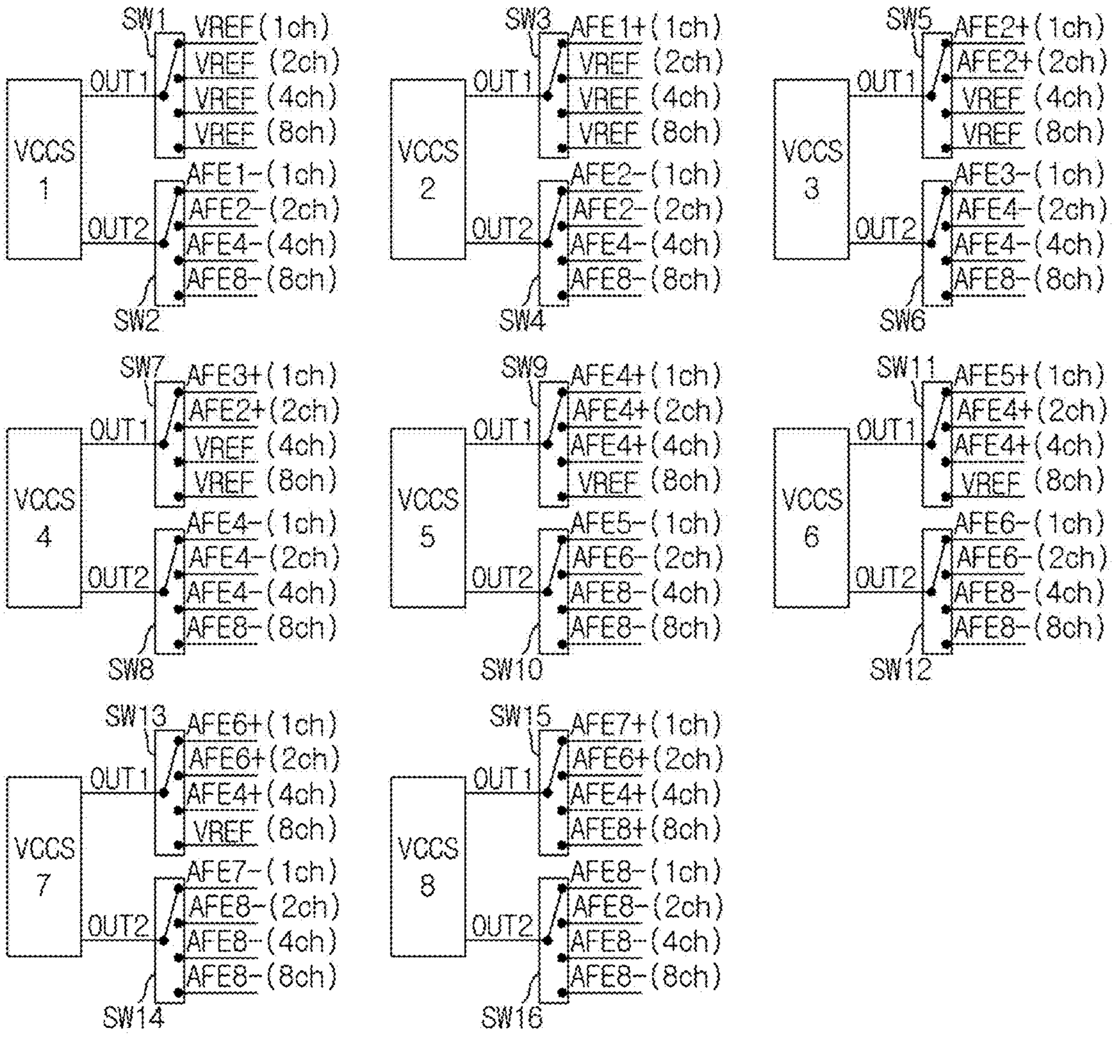
FIG. 9 is a view illustrating a structure of a switching unit according to an embodiment.

FIG. 9 is a view illustrating a structure of a switching unit according to an embodiment. In more detail, FIG. 9 illustrates a structure of the first to sixteenth switching units (SW1 to SW16) among the switching units (SW1 to SW2*n*) as an example.

Referring to FIG. 9, each of the switching units (SW1 to SW16) may include switching input terminals input to the mirror output terminals (OUT1 and OUT2) of the corresponding voltage controlled current sources (VCCS1 to VCCS8) and switching output terminals connected to the input terminal of the analog front-end circuits (AFE1 to AFE8) or the reference voltage (VREF). In FIG. 9, an example in which one switching unit (SW1 to SW16) includes four switching output terminals is illustrated, however, the switching unit (SW1 to SW16) may include the number of output terminals fewer or greater than four.

The switching input terminal of each of the switching units (SW1 to SW16) is connected to the mirror output terminal (OUT1 and OUT2) of the corresponding voltage controlled current sources (VCCS1 to VCCS8). For example, a switching input terminal of a first switching unit SW1 may be connected to the first mirror output terminal (OUT1) of the first voltage controlled current source (VCVS1), and a switching input terminal of a second switching unit SW2 may be connected to the second mirror output terminal (OUT2) of the first voltage controlled current source (VCVS1). In addition, a switching input terminal of a third switching unit SW3 may be connected to the first mirror output terminal (OUT1) of the second voltage controlled current source (VCVS2), and a switching input terminal of a fourth switching unit SW4 may be connected to the second mirror output terminal (OUT2) of the second voltage controlled current source (VCVS2).

Each of the switching output terminals is connected to the input terminal of the analog front-end circuits (AFE1 to AFE8) or the reference voltage (VREF). The connection state of the switching output terminals may be determined based on a connection relation between the voltage controlled current sources (VCVS1 to VCVS8) and the voltage controlled current sources (VCCS1 to VCCSn) in the binding modes, and the connection state may be each different per switching unit (SW1 to SW8).

Referring to FIG. 2, FIGS. 5 to 7 together, the first mirror output terminal (OUT1) of the first voltage controlled current source (VCCS1) is connected to the reference voltage (VREF) in the one-channel binding mode, and is being floated in the two to eight-channel binding modes. In order to prevent or reduce the likelihood of the first mirror output terminal (OUT1) from being floated, all of the first to the fourth output terminals of the first switching unit SW1 connected to the first mirror output terminal (OUT1) of the first voltage controlled current source (VCCS1) may be connected to a reference voltage line to which the reference voltage (VREF) is applied.

The second mirror output terminal (OUT2) of the first voltage controlled current source (VCCS1) may be connected to the first input terminal (AFE1−) of the first analog front end circuit (AFE1) in the one-channel binding mode, may be connected to a first input terminal (AFE2−) of the second analog front end circuit (AFE2) in the two-channel binding mode, may be connected to a first input terminal (AFE4−) of the fourth analog front end circuit (AFE4) in the four-channel binding mode, and may be connected to a first input terminal (AFE8−) of an eighth analog front end circuit (AFE8) in the eight-channel binding mode. Therefore, the first to the fourth output terminals of the second switching unit (SW2) connected to the second mirror output terminal (OUT2) of the first voltage controlled current source (VCCS1) may be connected to the first input terminals (AFE1−, AFE2−, AFE4− and AFE8−) of the first, second, fourth and eighth analog front-end circuits (AFE1, AFE2, AFE4 and AFE8), respectively.

The first mirror output terminal (OUT1) of the second voltage controlled current source (VCCS2) may be connected to a second input terminal (AFE1+) of the first analog front-end circuit (AFE1) in the one-channel binding mode, and may be floated in the two, four, and eight-channel binding modes. In order to prevent the first mirror output terminal (OUT1) from being floated, the first output terminal of the third switching unit SW3 connected to the first mirror output terminal (OUT1) of the second voltage controlled current source (VCCS2) may be connected to the second input terminal (AFE1+) of the first analog front end circuit (AFE1), and the second to the fourth output terminals may be connected to the reference voltage line to which the reference voltage (VREF) is applied.

The second mirror output terminal (OUT2) of the second voltage controlled current source (VCCS2) may be connected to the first input terminal (AFE2−) of the second analog front end circuit (AFE2) in the one-channel and the two-channel binding modes, may be connected to the first input terminal (AFE4−) of the fourth analog front end circuit (AFE4) in the four-channel binding mode, and may be connected to the first input terminal (AFE8−) of the eighth analog front end circuit (AFE8) in the eight-channel binding mode. Therefore, the first and the second output terminals connected to the second mirror output terminal (OUT2) of the second voltage controlled current source (VCCS2) may be connected to the first input terminal (AFE2−) of the second analog front end circuits (AFE2), the third output terminal may be connected to the first input terminal (AFE4−) of the fourth analog front end circuits (AFE4), and the fourth output terminal may be connected to the first input terminal (AFE8−) of the eighth analog front end circuits (AFE8).

The output terminals of the third to the eighth switching units (SW3 to SW8) are connected in the same manner, and thus, detailed description thereof will be omitted.

The switching unit (SW1 to SW8) may include a switching element connecting the switching input terminal to one among the plurality of switching output terminals. The switching element may connect the switching input terminal to one among the first to the fourth switching output terminals according to a control signal supplied from an external device.

At this instance, the switching element may connect the switching input terminal to one among the first to the fourth switching output terminals in correspondence with the binding mode. For example, the switching element may connect the switching input terminal to the first switching output terminal in the one-channel binding mode, may connect the switching input terminal to the second switching output terminal in the two-channel binding mode, may connect the switching input terminal to the third switching output terminal in the four-channel binding mode, and may connect the switching input terminal to the fourth switching output terminal in the eight-channel binding mode.

Meanwhile, the number and the kind of the binding mode are not limited to above-described ones. According to the embodiments, a fewer or a greater number of the binding modes may be set, and the quantity and the connection state of the output terminals of the switching unit (SW1 to SW8) may be changed according to a setup state of the binding mode.

In the embodiment illustrated in FIG. 9, the switching units (SW1 to SW8) or switching circuits prevent the floating state by connecting the mirror output terminal of the voltage controlled current source expecting to be floated to the reference voltage (VREF), according to the binding mode. Therefore, it is possible to improve the sensing accuracy by implementing the binding mode, while improving the sensing accuracy through reduction or removal of interference and noise according to the floating node by preventing the mirror output terminal from being floated in the binding structure.

Figure 10:
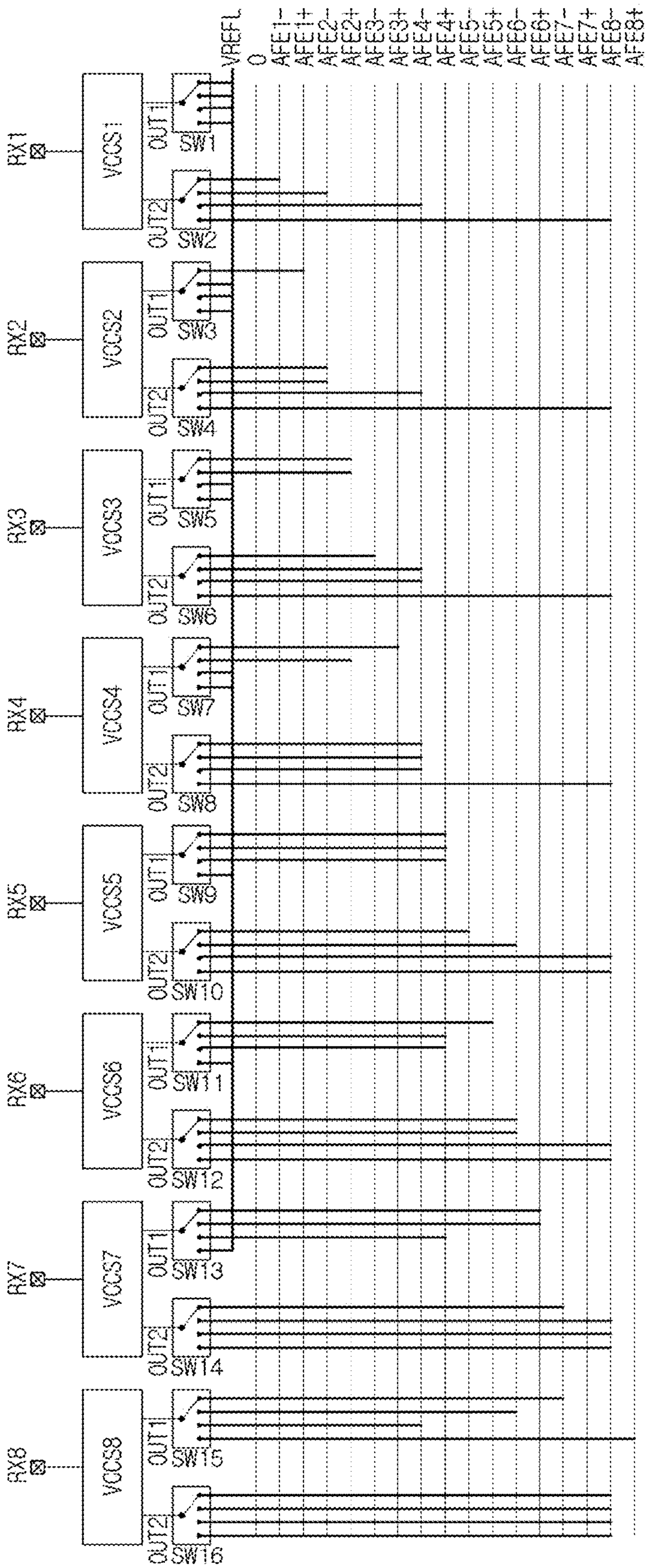
FIG. 10 is a view illustrating connection relations between switching units and analog front-end circuits illustrated in FIG. 9 in greater detail according to an embodiment.

FIG. 10 is a view illustrating connection relations between the switching units and the analog front-end circuits illustrated in FIG. 9 in greater detail. In FIG. 10, only part of the input sensing device is illustrated for convenience of description.

Referring to FIG. 10, the reference voltage line (VREFL) which applies the reference voltage (VREF) may be disposed between the switching units (SW1 to SW16) and the analog front-end circuits (AFE1 to AFE8). The reference voltage line (VREFL) is disposed adjacent to the switching units (SW1 to SW16) and may extend long along the switching units (SW1 to SW16) which will be connected to the reference voltage line (VREFL).

Wirings, connected to each of the input terminals (AFE1− to AFE8+) of the analog front-end circuits (AFE1 to AFE8) may be additionally formed between the switching units (SW1 to SW16) and the analog front-end circuits (AFE1 to AFE8). The wirings may be disposed adjacent to the analog front-end circuits (AFE1 to AFE8), and may extend long along the analog front end circuits (AFE1 to AFE8).

As described referring to FIG. 9, each of the switching units (SW1 to SW8) includes the switching input terminal and the switching output terminals. The switching input terminal of the switching units (SW1 to SW8) may be connected to the mirror output terminal (OUT1 and OUT2) corresponding thereto, respectively, and the switching output terminals thereof may be connected to the input terminals (AFE1− to AFE8+) of the analog front-end circuits (AFE1 to AFEn) corresponding thereto or the reference voltage line (VREFL).

The connection relations between the switching units (SW1 to SW8) and other components is the same as the description provided referring to FIG. 9, and thus, the detailed description thereof will be omitted.

Figure 11:
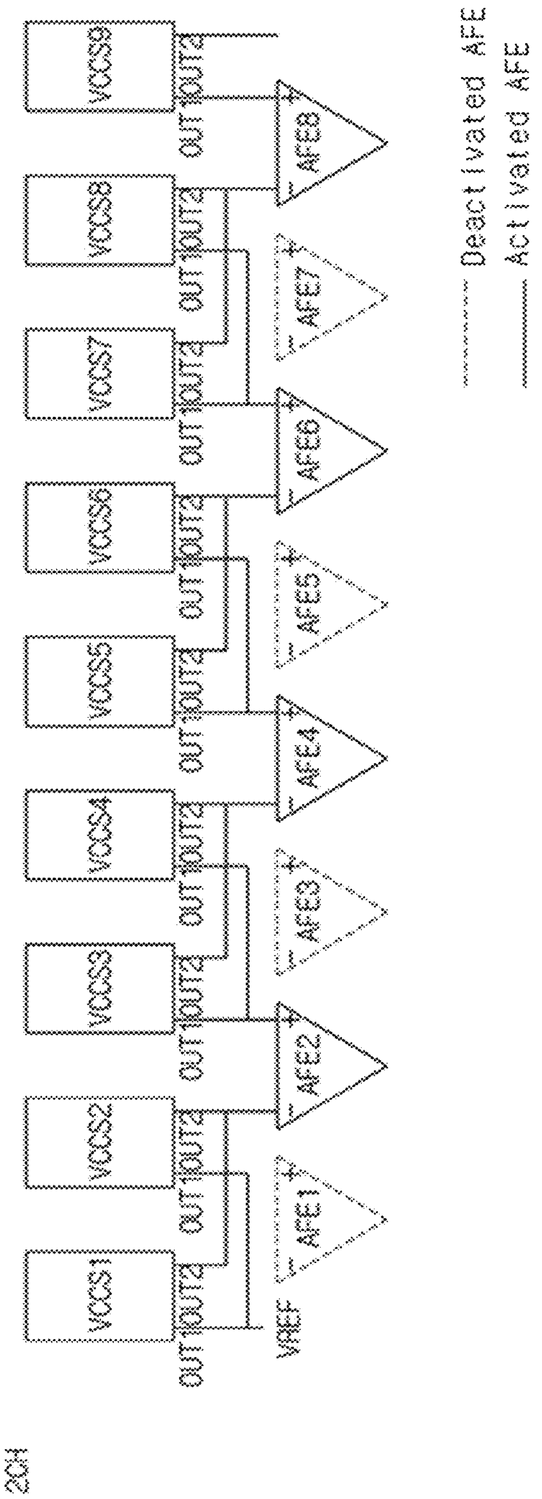
FIGS. 11 to 13 are plan views illustrating embodiments of an input sensing device bound through a switching unit of FIG. 9 according to an embodiment.
Figure 12:
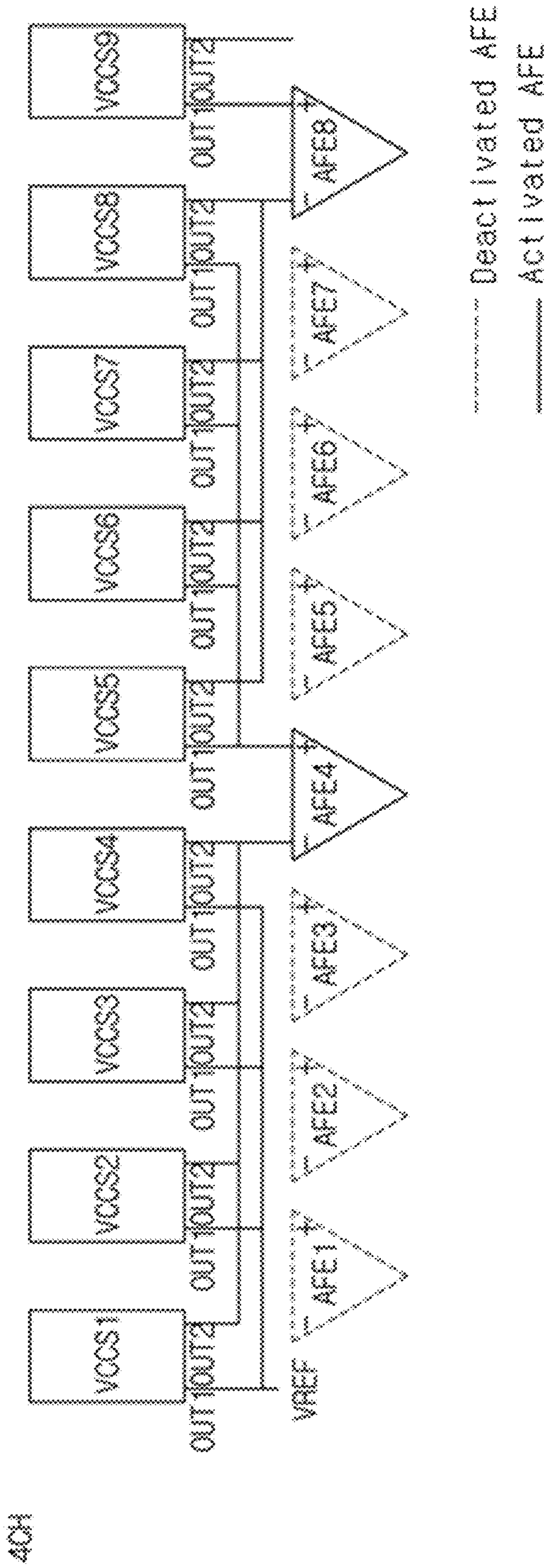
Figure 13:
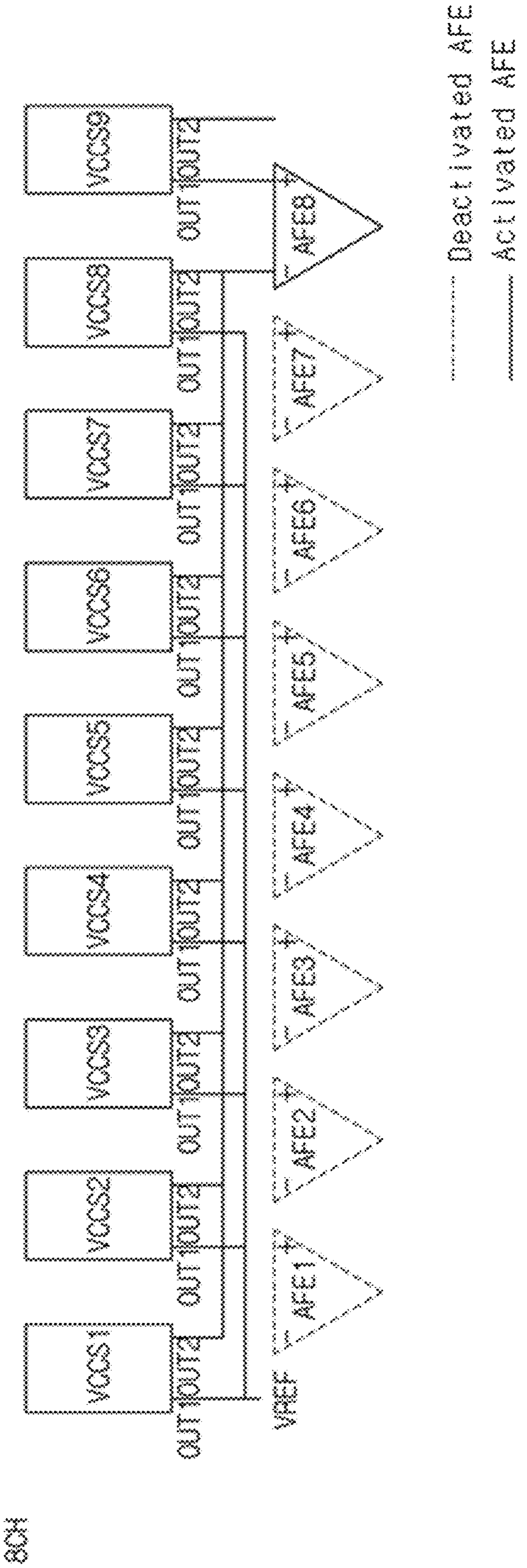

FIGS. 11 to 13 are plan views illustrating embodiments of the input sensing device bound through the switching unit of FIG. 9. In FIGS. 11 to 13, for convenience of description, only part of the input sensing device is illustrated, and illustration of the switching unit will be omitted.

Referring to FIG. 11, in the two-channel binding mode, the switching input terminals of the switching units (SW1 to SW8, FIG. 9) are connected to the second switching output terminals. Accordingly, the mirror output terminal (OUT1 and OUT2) of the voltage controlled current sources (VSS1 to VCSS9) connected to the switching input terminal of the switching unit (SW1 to SW8) may be connected to the input terminal of the analog front end circuits (AFE1 to AFE8) corresponding thereto or the reference voltage (VREF) through the switching unit (SW1 to SW8).

For example, the first mirror output terminal (OUT1) of the first voltage controlled current source (VCCS1) may be connected to the reference voltage (VREF) through the first switching unit (SW1), and the second mirror output terminal (OUT2) thereof may be connected to the first input terminal (AFE2−) of the second analog front end circuit (AFE2) through the second switching unit (SW2).

The first mirror output terminal (OUT1) of the second voltage controlled current source (VCCS2) may be connected to the reference voltage (VREF) through the third switching unit (SW3), and the second mirror output terminal (OUT2) thereof may be connected to the first input terminal (AFE2−) of the second analog front end circuit (AFE2) through the fourth switching unit (SW4).

The first mirror output terminal (OUT1) of the third voltage controlled current source (VCCS3) may be connected to a second input terminal (AFE2+) of the second analog front end circuit (AFE2) through the fifth switching unit (SW5), and the second mirror output terminal (OUT2) thereof may be connected to the first input terminal (AFE4−) of the fourth analog front end circuit (AFE4) through the sixth switching unit (SW6).

The first mirror output terminal (OUT1) of the fourth voltage controlled current source (VCCS4) may be connected to the second input terminal (AFE2+) of the second analog front end circuit (AFE2) through the seventh switching unit (SW7), and the second mirror output terminal (OUT2) thereof may be connected to the first input terminal (AFE4−) of the fourth analog front end circuit (AFE4) through the eighth switching unit (SW8).

The connection relation between the remaining circuit elements is the same as the above description, therefore, the detailed description thereof will be omitted.

Referring to FIG. 12, in the four-channel binding mode, the switching input terminals of the switching units (SW1 to SW8) are connected to the third output terminals. Accordingly, the mirror output terminal (OUT1 and OUT2) of the voltage controlled current sources (VCCS1 to VCCS9) connected to the switching input terminal of the switching unit (SW1 to SW8) may be connected to the input terminal of the analog front end circuits (AFE1 to AFE8) corresponding thereto or the reference voltage (VREF) through the switching unit (SW1 to SW8).

For example, the first mirror output terminal (OUT1) of the first voltage controlled current source (VCCS1) may be connected to the reference voltage (VREF) through the first switching unit (SW1), and the second mirror output terminal (OUT2) thereof may be connected to the first input terminal (AFE4−) of the fourth analog front-end circuit (AFE4) through the second switching unit (SW2).

The first mirror output terminal (OUT1) of the second voltage controlled current source (VCCS2) may be connected to the reference voltage (VREF) through the third switching unit (SW3), and the second mirror output terminal (OUT2) thereof may be connected to the first input terminal (AFE4−) of the fourth analog front-end circuit (AFE4) through the fourth switching unit (SW4).

The first mirror output terminal (OUT1) of the third voltage controlled current source (VCCS3) may be connected to the reference voltage (VREF) through the fifth switching unit (SW5), and the second mirror output terminal (OUT2) thereof may be connected to the first input terminal (AFE4−) of the fourth analog front-end circuit (AFE4) through the sixth switching unit (SW6).

The first mirror output terminal (OUT1) of the fourth voltage controlled current source (VCCS4) may be connected to the reference voltage (VREF) through the seventh switching unit (SW7), and the second mirror output terminal (OUT2) thereof may be connected to the first input terminal (AFE4−) of the fourth analog front-end circuit (AFE4) through the eighth switching unit (SW8).

The connection relation between the remaining circuit elements is the same as the above description, therefore, the detailed description thereof will be omitted.

Referring to FIG. 13, in the eight-channel binding mode, the switching input terminals of the switching units (SW1 to SW8) are connected to the fourth output terminals. Accordingly, the mirror output terminal (OUT1 and OUT2) of the voltage controlled current sources (VCCS1 to VCCS9) connected to the switching input terminal of the switching unit (SW1 to SW8) may be connected to the input terminal of the analog front-end circuits (AFE1 to AFE8) corresponding thereto or the reference voltage (VREF) through the switching units (SW1 to SW8).

For example, the first mirror output terminal (OUT1) of the first voltage controlled current source (VCCS1) may be connected to the reference voltage (VREF) through the first switching unit (SW1), and the second mirror output terminal (OUT2) thereof may be connected to the first input terminal (AFE8−) of the eighth analog front-end circuit (AFE8) through the second switching unit (SW2).

The first mirror output terminal (OUT1) of the second voltage controlled current source (VCCS2) may be connected to the reference voltage (VREF) through the third switching unit (SW3), and the second mirror output terminal (OUT2) thereof may be connected to the first input terminal (AFE8−) of the eighth analog front-end circuit (AFE8) through the fourth switching unit (SW4).

The first mirror output terminal (OUT1) of the third voltage controlled current source (VCCS3) may be connected to the reference voltage (VREF) through the fifth switching unit (SW5), and the second mirror output terminal (OUT2) thereof may be connected to the first input terminal (AFE8−) of the eighth analog front-end circuit (AFE8) through the sixth switching unit (SW6).

The first mirror output terminal (OUT1) of the fourth voltage controlled current source (VCCS4) may be connected to the reference voltage (VREF) through the seventh switching unit (SW7), and the second mirror output terminal (OUT2) thereof may be connected to the first input terminal (AFE8−) of the eighth analog front-end circuit (AFE8) through the eighth switching unit (SW8).

The connection relation between the remaining circuit elements is the same as the above description, therefore, the detailed description thereof will be omitted.

As illustrated, in the present embodiment, the mirror output terminals (OUT1 and OUT2) of the voltage controlled current sources (VCCS1 to VCCSn) are not floated. The mirror output terminals (OUT1 and OUT2) of the voltage controlled current sources (VCCS1 to VCCSn) are connected to the reference voltage (VREF) through the switching units (SW1 to SW2*n*), rather than being floated. Therefore, the input sensing device according to the present embodiment can reduce or remove interference and noise caused due to the floating node and improve the sensing accuracy by preventing the mirror output terminal from being floated in the binding structure.

Figure 14:
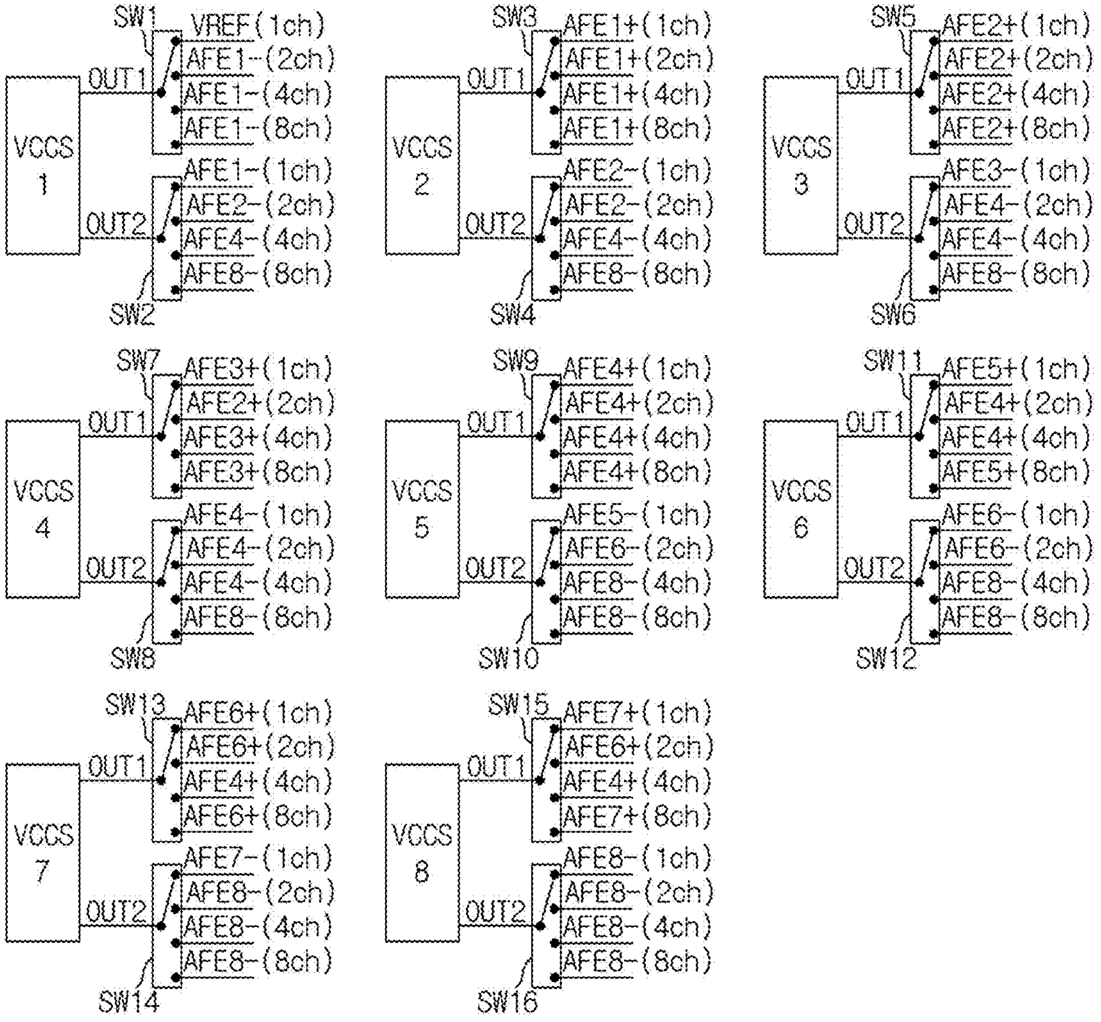
FIG. 14 is a view illustrating a structure of a switching unit according to another embodiment.

FIG. 14 is a view illustrating a structure of a switching unit according to another embodiment. In more detail, FIG. 14 exemplarily illustrates a structure of the first to the sixteenth switching units (SW1 to SW16) among the switching units (SW1 to SW2*n*).

Referring to FIG. 14, each of the switching units (SW1 to SW16) may include switching input terminals input to the mirror output terminal (OUT1 and OUT2) of the voltage controlled current sources (VCCS1 to VCCS8) corresponding thereto, and the switching output terminals connected to the reference voltage (VREF) or the input terminal of the analog front-end circuits (AFE1 to AFE8). In FIG. 14, an example in which one switching unit (SW1 to SW16) includes four switching output terminals is illustrated, however, the switching unit (SW1 to SW16) may include the number of output terminals fewer or greater than four.

The switching input terminal of each of the switching units (SW1 to SW16) is connected to the mirror output terminal (OUT1 and OUT2) of the corresponding voltage controlled current sources (VCCS1 to VCCS8). For example, the switching input terminal of the first switching unit (SW1) may be connected to the first mirror output terminal (OUT1) of the first voltage controlled current source (VCVS1), and the switching input terminal of the second switching unit (SW2) may be connected to the second mirror output terminal (OUT2) of the first voltage controlled current source (VCVS1). In addition, the switching input terminal of the third switching unit (SW3) may be connected to the first mirror output terminal (OUT1) of the second voltage controlled current source (VCVS2), and the switching input terminal of the fourth switching unit (SW4) may be connected to the second mirror output terminal (OUT2) of the second voltage controlled current source (VCVS2).

Each of the switching output terminals is connected to the input terminal of the analog front-end circuits (AFE1 to AFE8) or the reference voltage (VREF). The connection state of the switching output terminals may be determined based on a connection relation between the voltage controlled current sources (VCVS1 to VCVS8) and the voltage controlled current sources (VCCS1 to VCCSn) in the binding modes, and the connection state may be each different per switching unit (SW1 to SW8).

Referring to FIG. 2, FIGS. 5 to 7 together, the first mirror output terminal (OUT1) of the first voltage controlled current source (VCCS1) is connected to the reference voltage (VREF) in the one-channel binding mode, and is being floated in the two to eight-channel binding modes. In order to prevent the first mirror output terminal (OUT1) from being floated, the first output terminal of the first switching unit (SW1) connected to the first mirror output terminal (OUT1) of the first voltage controlled current source (VCCS1) may be connected to the reference voltage line to which the reference voltage (VREF) is applied, and the second to the fourth output terminals may be connected to the first input terminal (AFE1−) of the adjacent deactivated first analog front end circuit (AFE1).

The second mirror output terminal (OUT2) of the first voltage controlled current source (VCCS1) may be connected to the first input terminal (AFE1−) of the activated first analog front end circuit (AFE1) in the one-channel binding mode, may be connected to the first input terminal (AFE2−) of the activated second analog front end circuit (AFE2) in the two-channel binding mode, may be connected to the first input terminal (AFE4−) of the activated fourth analog front end circuit (AFE4) in the four-channel binding mode, and may be connected to the first input terminal (AFE8−) of the activated eighth analog front end circuit (AFE8) in the eight-channel binding mode. Therefore, the first to the fourth output terminals of the second switching unit (SW2) connected to the second mirror output terminal (OUT2) of the first voltage controlled current source (VCCS1) may be connected to the first input terminals (AFE1−, AFE2−, AFE4− and AFE8−) of the first, second, fourth and eighth analog front-end circuits (AFE1, AFE2, AFE4 and AFE8), respectively.

The first mirror output terminal (OUT1) of the second voltage controlled current source (VCCS2) may be connected to the second input terminal (AFE1+) of the first analog front-end circuit (AFE1) in the one-channel binding mode, and may be floated in the two, four, and eight-channel binding modes. In order to prevent the first mirror output terminal (OUT1) from being floated, the first output terminal of the third switching unit SW3 connected to the first mirror output terminal (OUT1) of the second voltage controlled current source (VCCS2) may be connected to the second input terminal (AFE1+) of the first analog front end circuit (AFE1), and the second to the fourth output terminals may be connected to the second input terminal (AFE1+) of the adjacent deactivated first analog front end circuit (AFE1).

The second mirror output terminal (OUT2) of the second voltage controlled current source (VCCS2) may be connected to the first input terminal (AFE2−) of the second analog front end circuit (AFE2) in the one and two-channel binding modes, may be connected to the first input terminal (AFE4−) of the fourth analog front end circuit (AFE4) in the four-channel binding mode, and may be connected to the first input terminal (AFE8−) of the eighth analog front end circuit (AFE8) in the eight-channel binding mode. Therefore, the first and the second output terminals connected to the second mirror output terminal (OUT2) of the second voltage controlled current source (VCCS2) may be connected to the first input terminal (AFE2−) of the second analog front end circuit (AFE2), the third output terminal thereof may be connected to the first input terminal (AFE4−) of the fourth analog front end circuit (AFE4), and the fourth output terminal thereof may be connected to the first input terminal (AFE8−) of the eighth analog front end circuit (AFE8).

The output terminals of the third to the eighth switching units (SW3 to SW8) are connected in the same manner, therefore, the detailed description thereof will be omitted.

The switching unit (SW1 to SW8) may include the switching element for connecting the switching input terminal to be connected to one among the plurality of switching output terminals. The switching element may connect the switching input terminal to one among the first to the fourth switching output terminals according to a control signal provided from an external device.

At this instance, the switching element may connect the switching input terminal to one among the first to the fourth switching output terminals in correspondence with the binding mode. For example, the switching element may connect the switching input terminal to the first switching output terminal in the one-channel binding mode, may connect the switching input terminal to the second switching output terminal in the two-channel binding mode, may connect the switching input terminal to the third switching output terminal in the four-channel binding mode, and may connect the switching input terminal to the fourth switching output terminal in the eight-channel binding mode.

Meanwhile, the number and the kind of the binding mode are not limited to above-described ones. According to the embodiments, a fewer or a greater number of the binding modes may be set, and the quantity and the connection state of the output terminals of the switching unit (SW1 to SW8) may be changed according to a setup state of the binding mode.

In addition, the kinds of the deactivated analog front-end circuit to which the floated mirror output terminal of the voltage controlled current source is connected are not necessarily limited to the illustrated one. That is, the floated mirror output terminal of the voltage controlled current source may be determined differently according to an arrangement relation between the voltage controlled current source and the analog front-end circuit, and the like, and any input terminal of the deactivated analog front end circuit adjacent to the mirror output terminal may be used.

In the illustrated embodiment in FIG. 14, the switching unit (SW1 to SW8) may connect the mirror output terminal of the voltage controlled current source to be floated to the adjacent deactivated analog front-end circuit according to the binding mode, thereby preventing the floating state. Therefore, it is possible to improve the sensing accuracy by implementing the binding mode, and to reduce or remove interference and noise caused according to the floating node, by preventing the mirror output terminal from being floated in the binding structure.

Figure 15:
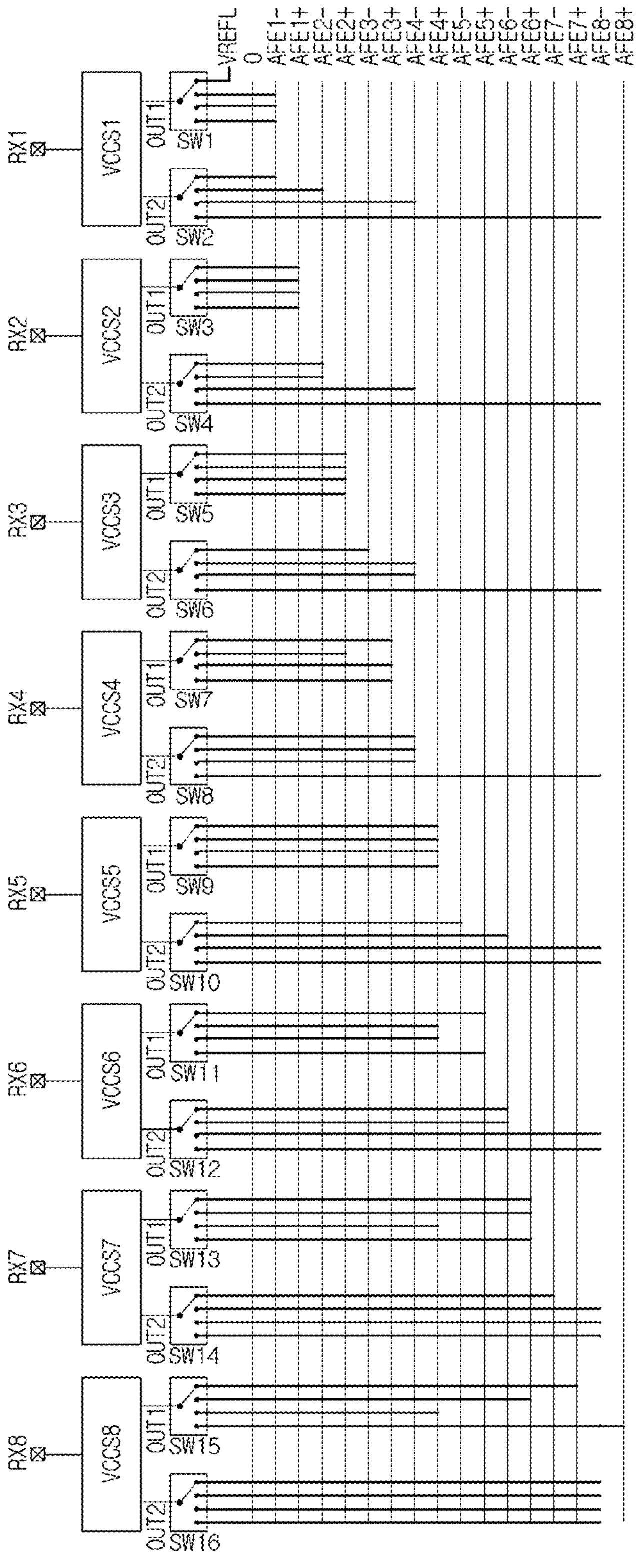
FIG. 15 is a view illustrating connection relations between switching units and analog front-end circuits illustrated in FIG. 14 in greater detail according to an embodiment.

FIG. 15 is a view illustrating connection relations between the switching units and the analog front-end circuits illustrated in FIG. 14 in greater detail. In FIG. 15, only part of the input sensing device is illustrated for convenience of description.

Referring to FIG. 15, wirings, connected to each of the input terminals (AFE1− to AFE8+) of the analog front-end circuits (AFE1 to AFE8), may be additionally formed between the switching units (SW1 to SW16) and the analog front-end circuits (AFE1 to AFE8). The wirings may be disposed adjacent to the analog front-end circuits (AFE1 to AFE8), and may extend long along the analog front end circuits (AFE1 to AFE8).

As described referring to FIG. 14, each of the switching units (SW1 to SW8) includes the switching input terminal and the switching output terminals. The switching input terminal of the switching units (SW1 to SW8) may be connected to the mirror output terminals (OUT1 and OUT2) corresponding thereto, respectively, and the switching output terminals thereof may be connected to the input terminals (AFE1- to AFE8+) of the analog front-end circuits (AFE1 to AFE8) corresponding thereto or the reference voltage line (VREFL).

The connection relations between the switching units (SW1 to SW16) and other components is the same as the description provided referring to FIG. 9, and thus, the detailed description thereof will be omitted.

Figure 16:
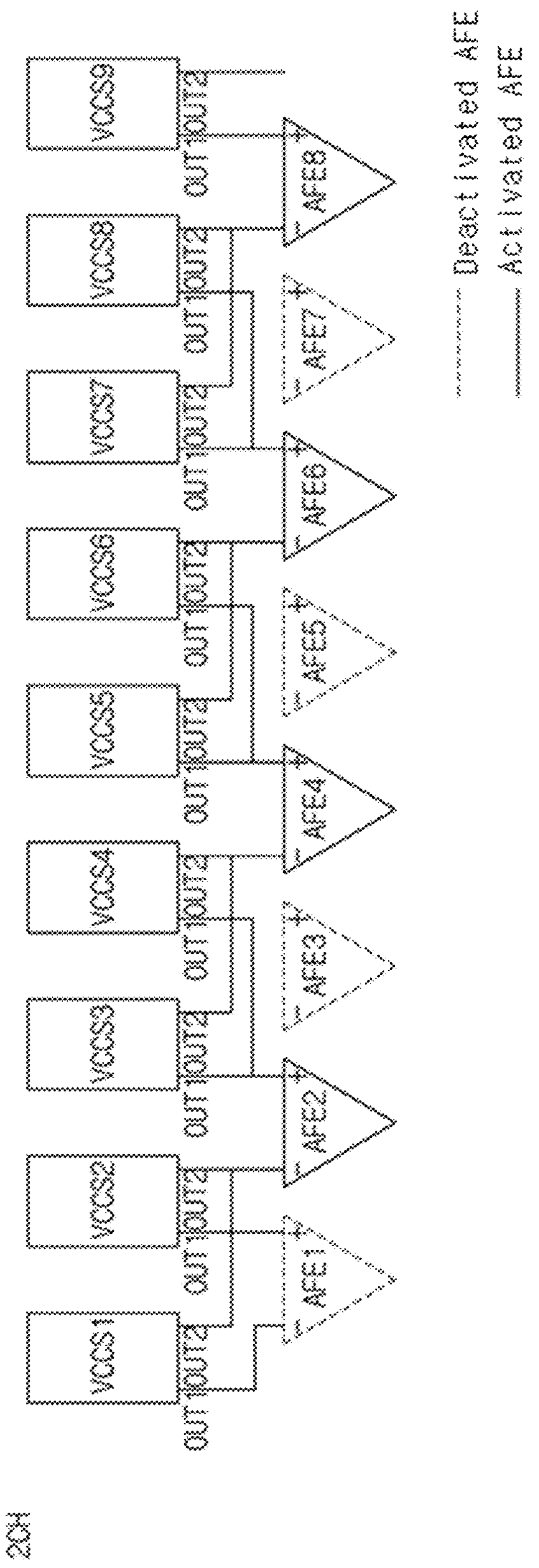
FIGS. 16 to 18 are plan views illustrating embodiments of an input sensing device bound through a switching unit of FIG. 14 according to an embodiment.
Figure 17:
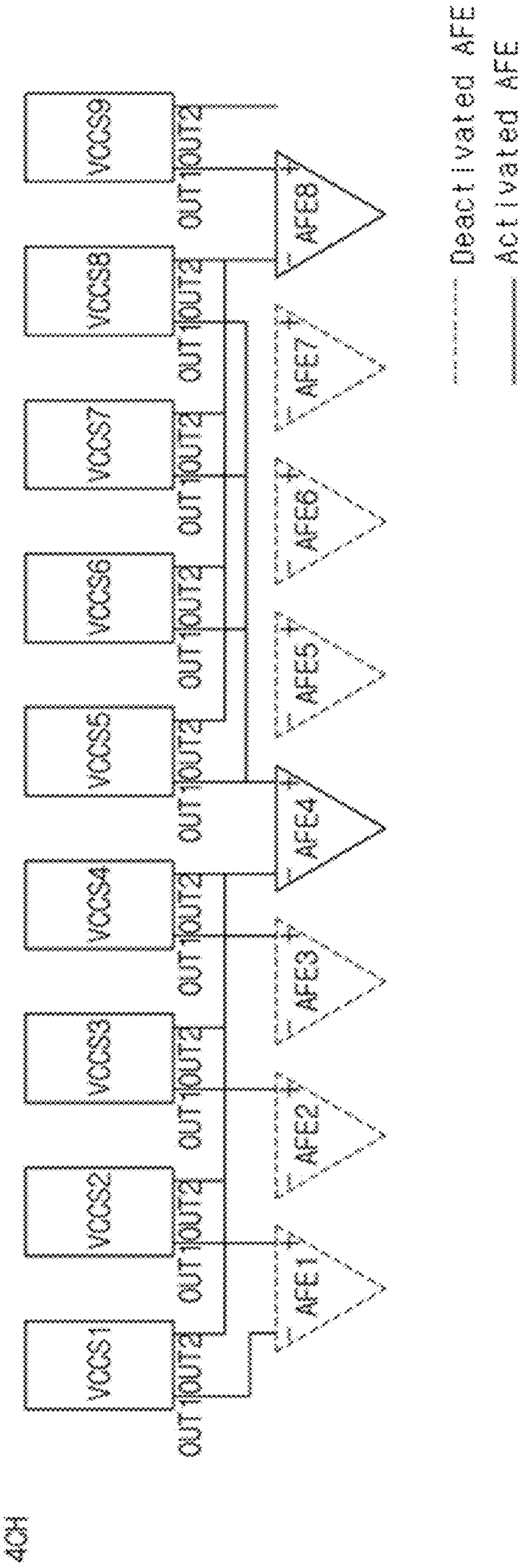
Figure 18:
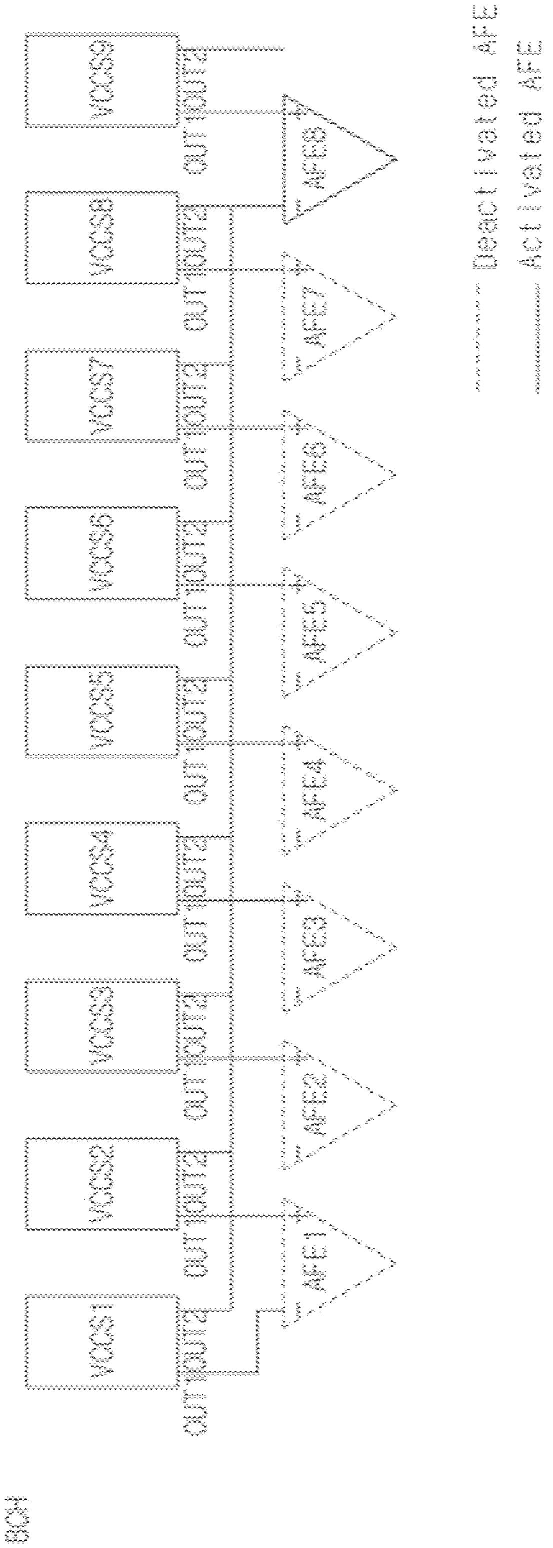

FIGS. 16 to 18 are plan views illustrating embodiments of an input sensing device bound through the switching unit of FIG. 14 according to an embodiment. In FIGS. 16 to 18, only part of the input sensing device is illustrated for convenience of description, and the illustration of the switching unit is omitted.

Referring to FIG. 16, in the two-channel binding mode, the switching input terminals of the switching units (SW1 to SW8, FIG. 14) are connected to the second switching output terminals. Accordingly, the mirror output terminal (OUT1 and OUT2) of the voltage controlled current sources (VSS1 to VCSS9) connected to the switching input terminal of the switching unit (SW1 to SW8) may be connected to the input terminal of the analog front-end circuits (AFE1 to AFE8) corresponding thereto or the reference voltage (VREF) through the switching unit (SW1 to SW8).

For example, the first mirror output terminal (OUT1) of the first voltage controlled current source (VCCS1) may be connected to a first input node (AFE1−) of the deactivated first analog front end circuit (AFE1) through the first switching unit (SW1), and the second mirror output terminal (OUT2) thereof may be connected to the first input terminal (AFE2−) of the second analog front end circuit (AFE2) through the second switching unit (SW2).

The first mirror output terminal (OUT1) of the second voltage controlled current source (VCCS2) may be connected to a second input node (AFE1+) of the first analog front end circuit (AFE1) through the third switching unit (SW3), and the second mirror output terminal (OUT2) thereof may be connected to the first input terminal (AFE2−) of the second analog front end circuit (AFE2) through the fourth switching unit (SW4).

The first mirror output terminal (OUT1) of the third voltage controlled current source (VCCS3) may be connected to the second input terminal (AFE2+) through the fifth switching unit (SW5), and the second mirror output terminal (OUT2) thereof may be connected to the first input terminal (AFE4−) of the fourth analog front-end circuit (AFE4) through the sixth switching unit (SW6).

The first mirror output terminal (OUT1) of the fourth voltage controlled current source (VCCS4) may be connected to the second input terminal (AFE2+) through the seventh switching unit (SW7), and the second mirror output terminal (OUT2) thereof may be connected to the first input terminal (AFE4−) of the fourth analog front-end circuit (AFE4) through the eighth switching unit (SW8).

The connection relation between the remaining circuit elements is the same as the above description, therefore, the detailed description thereof will be omitted.

Referring to FIG. 17, in the four-channel binding mode, the switching input elements of the switching units (SW1 to SW8) are connected to the third output terminals. Accordingly, the mirror output terminal (OUT1 and OUT2) of the voltage controlled current sources (VCCS1 to VCCS9) connected to the switching input terminal of the switching unit (SW1 to SW8) may be connected to the input terminal of the analog front end circuits (AFE1 to AFE8) corresponding thereto or the reference voltage (VREF) through the switching unit (SW1 to SW8).

For example, the first mirror output terminal (OUT1) of the first voltage controlled current source (VCCS1) may be connected to the first input node (AFE1−) of the deactivated first analog front end circuit (AFE1) through the first switching unit (SW1), and the second mirror output terminal (OUT2) thereof may be connected to the first input terminal (AFE4−) of the fourth analog front end circuit (AFE4) through the second switching unit (SW2).

The first mirror output terminal (OUT1) of the second voltage controlled current source (VCCS2) may be connected to the second input node (AFE1+) of the first analog front end circuit (AFE1) through the third switching unit (SW3), and the second mirror output terminal (OUT2) thereof may be connected to the first input terminal (AFE4−) of the activated fourth analog front end circuit (AFE2) through the fourth switching unit (SW4).

The first mirror output terminal (OUT1) of the third voltage controlled current source (VCCS3) may be connected to the second input node (AFE2+) of the deactivated second analog front end circuit (AFE2) through the fifth switching unit (SW5), and the second mirror output terminal (OUT2) thereof may be connected to the first input terminal (AFE4−) of the fourth analog front end circuit (AFE4) through the sixth switching unit (SW6).

The first mirror output terminal (OUT1) of the fourth voltage controlled current source (VCCS4) may be connected to the second input node (AFE3+) of the deactivated third analog front end circuit (AFE3) through the seventh switching unit (SW7), and the second mirror output terminal (OUT2) thereof may be connected to the first input terminal (AFE4−) of the activated fourth analog front end circuit (AFE4) through the eighth switching unit (SW8).

The connection relation between the remaining circuit elements is the same as the above description, therefore, the detailed description thereof will be omitted.

Referring to FIG. 18, in the eight-channel binding mode, the switching input elements of the switching units (SW1 to SW8) are connected to the fourth output terminals. Accordingly, the mirror output terminal (OUT1 and OUT2) of the voltage controlled current sources (VCCS1 to VCCS9) connected to the switching input terminal of the switching unit (SW1 to SW8) may be connected to the input terminal of the analog front-end circuits (AFE1 to AFE8) corresponding thereto or the reference voltage (VREF) through the switching unit (SW1 to SW8).

For example, the first mirror output terminal (OUT1) of the first voltage controlled current source (VCCS1) may be connected to the first input node (AFE1−) of the deactivated first analog front end circuit (AFE1) through the first switching unit (SW1), and the second mirror output terminal (OUT2) thereof may be connected to the first input terminal (AFE8−) of the eighth analog front end circuit (AFE8) through the second switching unit (SW2).

The first mirror output terminal (OUT1) of the second voltage controlled current source (VCCS2) may be connected to the second input node (AFE1+) of the deactivated first analog front end circuit (AFE1) through the third switching unit (SW3), and the second mirror output terminal (OUT2) thereof may be connected to the first input terminal (AFE8−) of the eighth analog front end circuit (AFE8) through the fourth switching unit (SW4).

The first mirror output terminal (OUT1) of the third voltage controlled current source (VCCS3) may be connected to the second input node (AFE2+) of the deactivated second analog front end circuit (AFE2) through the fifth switching unit (SW5), and the second mirror output terminal (OUT2) thereof may be connected to the first input terminal (AFE8−) of the activated eighth analog front end circuit (AFE8) through the sixth switching unit (SW6).

The first mirror output terminal (OUT1) of the fourth voltage controlled current source (VCCS4) may be connected to the second input node (AFE3+) of the deactivated third analog front end circuit (AFE3) through the seventh switching unit (SW7), and the second mirror output terminal (OUT2) thereof may be connected to the first input terminal (AFE8−) of the activated eighth analog front end circuit (AFE8) through the eighth switching unit (SW8).

The connection relation between the remaining circuit elements is the same as the above description, therefore, the detailed description thereof will be omitted.

As illustrated, in the present embodiment, the mirror output terminals (OUT1 and OUT2) of the voltage controlled current sources (VCCS1 to VCCS9) are not floated. The mirror output terminals (OUT1 and OUT2) of the voltage controlled current sources (VCCS1 to VCCS9) are connected to the adjacent deactivated analog front-end circuit through the switching units (SW1 to SW8), rather than being floated. Therefore, the input sensing device according to the present embodiment can reduce or remove interference and noise caused due to the floating node and improve the sensing accuracy by preventing the mirror output terminal from being floated in the binding structure.

Figure 19:
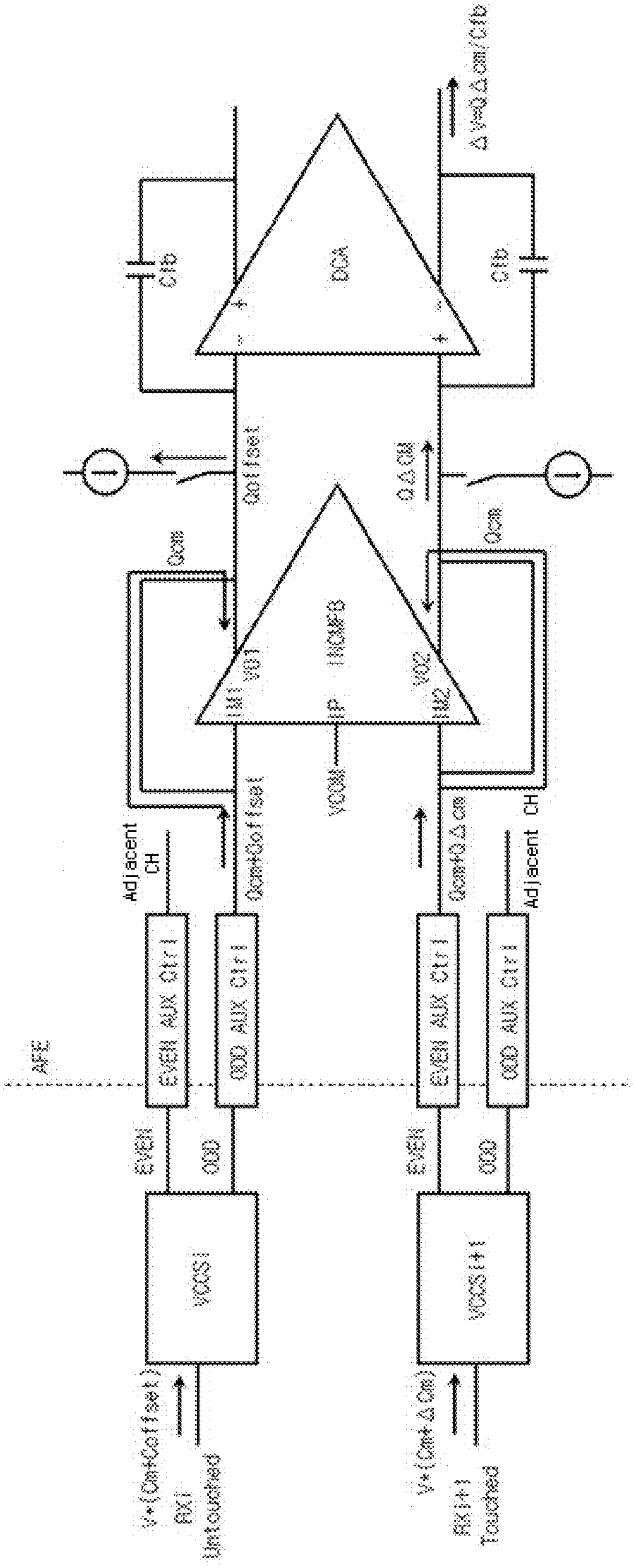
FIG. 19 is a view illustrating a structure of an analog front-end circuit according to the embodiment of FIG. 14 according to an embodiment.

FIG. 19 is a view illustrating a structure of the analog front-end circuit according to the embodiment of FIG. 14 according to an embodiment.

In FIG. 19, a case in which a touch input is not generated in an i-th sensing line (Rxi), and a touch input is generated in an i+1-th sensing line (Rxi+1) is assumed. Then, through the i-th sensing line (Rxi), a sensing voltage (V*(Cm+Coffset)) obtained by adding the reference capacitance (Cm) to a certain offset capacitance (Coffset) may be output, and through the i+1-th sensing line (Rxi+1), a sensing voltage (V*(Cm+ΔCm)) obtained by adding the reference capacitance (Cm) to a sensing capacitance (ΔCm) may be output. Here, the reference capacitance (Cm) is a capacitance basically present between a driving line (Tx) and a sensing line (Rx) as the driving current is applied to the driving line (Tx), the offset capacitance (Coffset) is a capacitance generated by neighboring noise and the like, and the sensing capacitance (ΔCm) is a capacitance generated by the touch input of the user.

A voltage input through each of the sensing lines (Rxi and Rxi+1) may be converted through the voltage controlled current sources (VCCSi and VCCSi+1). The i-th voltage controlled current source (VCCSi) may convert, for example, a sensing signal output from the i-th sensing line (Rxi) into a current and output the current, and convert a sensing signal output from the i+1-th sensing line (Rxi+1) into a current (Qcm+Qoffset and Qcm+QΔcm) and output the current.

The current (Qcm+Qoffset and Qcm+QΔcm) converted through the voltage controlled current sources (VCCSi and VCCSi+1) may be input to the analog front end circuit (AFE) through the input terminals (ODD AUX Ctrl and EVEN AUX Ctrl) of the analog front end circuit (AFE). In an embodiment, the input terminals (ODD AUX Ctrl and EVEN AUX Ctrl) may be an AUX control input terminal, but is not limited thereto.

In an embodiment, among the output terminals of the voltage controlled current sources (VCCSi and VCCSi+1), the output terminals not connected to the analog front end circuit (AFE) may be connected to the input terminal (CH) of the adjacent analog front end circuit (AFE).

The analog front-end circuit (AFE) may be configured with two amplifiers (INCMFB and DCA) connected in series.

A first amplifier (INCMFB) of the analog front-end circuit (AFE) is an input common mode feedback amp, and may be configured to remove a common component from an input signal, and to filter a difference signal only and output it. A first input terminal (IM1) of such a first amplifier (INCMFB) is connected to an i-th voltage controlled current source (VCCSi, i is a natural number), and a second input terminal (IM2) thereof is connected to an i+1-th voltage controlled current source (VCCSi+1). The first amplifier (INCMFB) may be further applied with a certain common voltage (VCOM) through a power input terminal (IP). The first amplifier (INCMFB) may be configured to feedback a common component (Qcm) of the current (Qcm+Qoffset and Qcm+QΔcm) input to each of the input terminals (IM1 and IM2).

Based on the current (Qcm+Qoffset and Qcm+QΔcm) input to the first amplifier (INCMFB), it is possible to remove the common component (Qcm) and filter the difference signal (Qoffset and QΔcm) only, and output a result to each of the output terminals (VO1 and VO2). At this instance, the offset current (Qoffset) output from the first output terminal (VO1) of the first amplifier (INCMFB) may be released to the outside through a switching connection to a certain current source.

The second amplifier (DCA) of the analog front-end circuit (AFE) is a differential charge amp, and may be configured to amplify and output a differential component of an input signal. A negative input terminal (−) of the second amplifier (DCA) may be connected to the first output terminal (VO1) of the first amplifier (INCMFB), and a positive input terminal (+) thereof may be connected to the second output terminal (VO2) of the first amplifier (INCMFB). A certain feedback capacitor (Cfb) may be connected between the negative input terminal (−) and the positive output terminal (+), and between the positive output terminal (+) and the negative input terminal (−) of the second amplifier (DCA).

The negative input terminal (−) of the second amplifier (DCA) operates not to receive the offset current (Qoffset), and may receive a ground or certain reference current. The positive input terminal (+) of the second amplifier (DCA) operates to receive the sensing current (QΔcm). The second amplifier (DCA) may amplify a voltage difference between the negative input terminal (−) and the positive input terminal (+) and output it to the output terminal. At this instance, a change amount of the voltage output to the output terminal of the second amplifier (DCA) is determined through the sensing current (QΔcm) which is an input current, and the feedback capacitor (Cfb), and may be determined as an equation, ΔV=QΔcm/Cfb, for example.

The embodiments of the present disclosure have been described with reference to accompanying drawings. Those of ordinary skill in the art will recognize that the present disclosure may be embodied in other specific forms without departing from its spirit or essential characteristics. The described embodiments are to be considered in all respects only as illustrative and not restrictive. The scope of the present disclosure is therefore indicated by the appended claims rather than by the foregoing description. All changes which come within meaning and range of equivalency of the claims are to be embraced within the scope of the present invention.

REFERENCE NUMERALS

12: data driving circuit
14: scan driving circuit
16: timing controller
18: host system
20: sensing driving circuit

What is claimed is:

1. An input sensing device, comprising:
a sensing panel including a plurality of driving lines and a plurality of sensing lines; and
a sensing driving circuit configured to sense an input based on input sensing signals output from the plurality of sensing lines,
wherein the sensing driving circuit includes:
a plurality of voltage controlled current sources connected to the plurality of sensing lines, respectively, the plurality of voltage controlled current sources configured to output mirror currents with respect to the input sensing signals to mirror output terminals;
a plurality of analog front end circuits configured to receive the mirror currents through input terminals and to output a differential signal corresponding to a difference of the mirror currents; and
switching units disposed between the plurality of voltage controlled current sources and the plurality of analog front end circuits, the switching units configured to connect the mirror output terminals of the plurality of voltage controlled current sources to one among the input terminals of the plurality of analog front end circuits and a reference voltage, and
wherein each of the switching units includes:
a switching input terminal connected to one mirror output terminal among the mirror output terminals to receive the mirror current output from the one mirror output terminal;
a plurality of switching output terminals, each of the plurality of switching output terminals connected to one among a reference voltage line applying the reference voltage and the input terminals of the plurality of analog front end circuits; and
a switching element configured to connect the switching input terminal to one switching output terminal among the plurality of switching output terminals.

2. The input sensing device of claim 1, wherein one input terminal of the plurality of analog front end circuits is connected to one or a plurality of mirror output terminals according to a binding mode.

3. The input sensing device of claim 2, wherein a switching unit from the switching units connects the mirror output terminals to one input terminal among the input terminals of the plurality of analog front end circuits and the reference voltage line according to the binding mode.

4. An input sensing device, comprising:
a sensing panel including a plurality of driving lines and a plurality of sensing lines; and
a sensing driving circuit configured to sense an input based on input sensing signals output from the plurality of sensing lines,
wherein the sensing driving circuit includes:
a plurality of voltage controlled current sources connected to the plurality of sensing lines, respectively, the plurality of voltage controlled current sources configured to output mirror currents with respect to the input sensing signals to mirror output terminals;
a plurality of analog front end circuits configured to receive the mirror currents through input terminals and to output a differential signal corresponding to a difference of the mirror currents; and
switching units configured to connect the mirror output terminals of the plurality of voltage controlled current sources to one among the input terminals of the plurality of analog front end circuits and a reference voltage, and
wherein each of the switching units includes:
a switching input terminal connected to one mirror output terminal among the mirror output terminals;
a plurality of switching output terminals, each of the plurality of switching output terminals connected to one among the reference voltage and the input terminals of the plurality of analog front end circuits; and
a switching element configured to connect the switching input terminal to one switching output terminal among the plurality of switching output terminals,
wherein one input terminal of the plurality of analog front end circuits is connected to one or a plurality of mirror output terminals according to a binding mode,
wherein a switching unit from the switching units connects the mirror output terminals to one input terminal among the input terminals of the plurality of analog front end circuits and the reference voltage according to the binding mode,
wherein first group analog front-end circuits are controlled to receive the mirror currents through the input terminals according to the binding mode, and
wherein in second group analog front-end circuits, at least one input terminal among the input terminals is controlled not to receive the mirror currents according to the binding mode.

5. The input sensing device of claim 4, wherein at least one switching unit among the switching units connects a connected mirror output terminal to one first group analog front-end circuit among the first group analog front-end circuits and a reference voltage according to the binding mode.

6. The input sensing device of claim 4, wherein at least one switching unit among the switching units connects a connected mirror output terminal to one first group analog front-end circuit among the first group analog front-end circuits or one second group analog front-end circuit among the second group analog front-end circuits according to the binding mode.

7. The input sensing device of claim 6, wherein the at least one switching unit connects the connected mirror output terminal to an input terminal of an adjacent second group analog front-end circuit among the second group analog front-end circuits according to the binding mode.

8. The input sensing device of claim 5, wherein the at least one switching unit is connected to an edge voltage controlled current sources disposed at an edge.

9. The input sensing device of claim 4, wherein in a one-channel binding mode in which the one input terminal is connected to the one mirror output terminal, at least some among the switching units connects a connected mirror output terminal to the reference voltage and remaining another among the switching units connects the connected mirror output terminal to one first group analog front-end circuit among the first group analog front-end circuits.

10. The input sensing device of claim 9, wherein in a multi-channel binding mode in which the one input terminal is connected to the plurality of mirror output terminals, at least some among the switching units connects a connected mirror output terminal to one first group analog front-end circuit among the first group analog front-end circuits, and remaining another among the switching units connects the connected mirror output terminal to one second group analog front-end circuit among the second group analog front-end circuits and the reference voltage.

11. The input sensing device of claim 10, wherein at least one voltage controlled current source among the plurality of voltage controlled current sources includes a first mirror output terminal and a second mirror output terminal, which output mirror currents generated by copying the input sensing signals, respectively.

12. The input sensing device of claim 11, wherein in the at least one voltage controlled current source among the plurality of voltage controlled current sources, the first mirror output terminal is connected to the reference voltage through a connected switching unit in the one-channel binding mode, and wherein in the at least one voltage controlled current source among the plurality of voltage controlled current sources, the second mirror output terminal is connected to one first group analog front end circuit among the first group analog front-end circuits through the connected switching unit in the one-channel binding mode.

13. The input sensing device of claim 11, wherein in the at least one voltage controlled current source among the plurality of voltage controlled current sources, the first mirror output terminal is connected to one first group analog front-end circuit among the first group analog front-end circuits through a connected switching unit in the multi-channel binding mode, and wherein in the at least one voltage controlled current source among the plurality of voltage controlled current sources, the second mirror output terminal is connected to one second group analog front-end circuit among the second group analog front-end circuits through the connected switching unit in the multi-channel binding mode.

14. A display device, comprising:

a display panel including a plurality of pixels;

a data driving circuit configured to apply a data voltage to the plurality of pixels;

a scan driving circuit configured to apply a gate signal to the plurality of pixels;

a timing controller configured to control an operation timing of the data driving circuit and the scan driving circuit;

a sensing panel disposed on the display panel and overlapping the display panel, the sensing panel including a plurality of driving lines and a plurality of sensing lines; and a sensing driving circuit configured to sense an input based on input sensing signals output from the plurality of sensing lines, wherein the sensing driving circuit comprises:

a plurality of voltage controlled current sources connected to the plurality of sensing lines, respectively, the plurality of voltage controlled current sources configured to output mirror currents with respect to the input sensing signals to mirror output terminals;

a plurality of analog front-end circuits configured to receive the mirror currents through input terminals and to output a differential signal corresponding to a difference of the mirror currents; and switching units disposed between the plurality of voltage controlled current sources and the plurality of analog front-end circuits, the switching units configured to connect the mirror output terminals of the plurality of voltage controlled current sources to one input terminal among the input terminals of the plurality of analog front-end circuits and a reference voltage, and wherein each of the switching units includes:

a switching input terminal connected to one mirror output terminal among the mirror output terminals to receive the mirror current output from the one mirror output terminal;

a plurality of switching output terminals, each of the plurality of switching output terminals connected to one among a reference voltage line applying the reference voltage and the input terminals of the plurality of analog front-end circuits; and a switching element configured to connect the switching input terminal to one switching output terminal among the plurality of switching output terminals.

15. The display device of claim 14, wherein the timing controller controls one input terminal of the plurality of analog front-end circuits to be connected to one or a plurality of mirror output terminals according to a binding mode, and wherein the timing controller transmits a control signal to the switching units so that the mirror output terminals are connected to at least one input terminal among input terminals of the plurality of analog front-end circuits and the reference voltage line according to the binding mode.

16. A display device, comprising:

a display panel including a plurality of pixels;

a data driving circuit configured to apply a data voltage to the plurality of pixels;

a scan driving circuit configured to apply a gate signal to the plurality of pixels;

a timing controller configured to control an operation timing of the data driving circuit and the scan driving circuit;

a sensing panel disposed on the display panel and overlapping the display panel, the sensing panel including a plurality of driving lines and a plurality of sensing lines; and a sensing driving circuit configured to sense an input based on input sensing signals output from the plurality of sensing lines, wherein the sensing driving circuit comprises:

a plurality of voltage controlled current sources connected to the plurality of sensing lines, respectively, the plurality of voltage controlled current sources configured to output mirror currents with respect to the input sensing signals to mirror output terminals;

a plurality of analog front-end circuits configured to receive the mirror currents through input terminals and to output a differential signal corresponding to a difference of the mirror currents; and switching units configured to connect the mirror output terminals of the plurality of voltage controlled current sources to one input terminal among the input terminals of the plurality of analog front-end circuits and a reference voltage, and wherein each of the switching units includes:

a switching input terminal connected to one mirror output terminal among the mirror output terminals;

a plurality of switching output terminals, each of the plurality of switching output terminals connected to one among the reference voltage and the input terminals of the plurality of analog front-end circuits; and a switching element configured to connect the switching input terminal to one switching output terminal among the plurality of switching output terminals, wherein the timing controller controls one input terminal of the plurality of analog front-end circuits to be connected to one or a plurality of mirror output terminals according to a binding mode, wherein the timing controller transmits a control signal to the switching units so that the mirror output terminals are connected to at least one input terminal among input terminals of the plurality of analog front-end circuits and the reference voltage according to the binding mode, wherein first group analog front-end circuits are controlled to receive the mirror currents through the input terminals according to the binding mode, and wherein in second group analog front-end circuits, at least one input terminal among the input terminals is controlled not to receive the mirror currents according to the binding mode.

17. The display device of claim 16, wherein at least one switching unit among the switching units connects a connected mirror output terminal to one first group analog front end circuit among the first group analog front-end circuits and a reference voltage according to the control signal.

18. The display device of claim 16, wherein at least one switching unit among the switching units connects a connected mirror output terminal to one first group analog front-end circuit among the first group analog front-end circuits or one second group analog front-end circuit among the second group analog front-end circuits according to the control signal.

19. The display device of claim 18, wherein the at least one switching unit connects the connected mirror output terminal to an input terminal among the input terminals of an adjacent second group analog front-end circuit among the second group analog front-end circuits according to the control signal.

* * * * *